United States Patent
Hughes et al.

(10) Patent No.: US 11,500,636 B2
(45) Date of Patent: *Nov. 15, 2022

(54) SPATIAL AND TEMPORAL MERGING OF REMOTE ATOMIC OPERATIONS

(71) Applicant: Intel Corporation, Santa Clara, CA (US)

(72) Inventors: Christopher J. Hughes, Santa Clara, CA (US); Joseph Nuzman, Haifa (IL); Jonas Svennebring, Sollentuna (SE); Doddaballapur N. Jayasimha, Saratoga, CA (US); Samantika S. Sury, Westford, MA (US); David A. Koufaty, Portland, OR (US); Niall D. McDonnell, Limerick (IE); Yen-Cheng Liu, Portland, OR (US); Stephen R. Van Doren, Portland, OR (US); Stephen J. Robinson, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/799,619

(22) Filed: Feb. 24, 2020

(65) Prior Publication Data

US 2020/0319886 A1  Oct. 8, 2020

Related U.S. Application Data

(63) Continuation of application No. 15/858,899, filed on Dec. 29, 2017, now Pat. No. 10,572,260.

(51) Int. Cl.
*G06F 9/30* (2018.01)
*G06F 12/0875* (2016.01)

(52) U.S. Cl.
CPC ........ *G06F 9/30181* (2013.01); *G06F 9/3004* (2013.01); *G06F 9/3005* (2013.01);
(Continued)

(58) Field of Classification Search
CPC ............... G06F 9/30181; G06F 9/3004; G06F 9/30047; G06F 9/3005; G06F 9/30145;
(Continued)

(56) References Cited

U.S. PATENT DOCUMENTS 4,750,154 A     6/1988  Lefsky et al.
5,459,842 A  *  10/1995 Begun ................. G06F 13/1631
                                                    710/68

(Continued)

OTHER PUBLICATIONS

Communication pursuant to Article 94(3) EPC, EP App. No. 18209326.0, dated Oct. 6, 2020, 11 pages.
(Continued)

*Primary Examiner* — Corey S Faherty
(74) *Attorney, Agent, or Firm* — Nicholson De Vos Webster & Elliott LLP

(57) ABSTRACT

Disclosed embodiments relate to spatial and temporal merging of remote atomic operations. In one example, a system includes an RAO instruction queue stored in a memory and having entries grouped by destination cache line, each entry to enqueue an RAO instruction including an opcode, a destination identifier, and source data, optimization circuitry to receive an incoming RAO instruction, scan the RAO instruction queue to detect a matching enqueued RAO instruction identifying a same destination cache line as the incoming RAO instruction, the optimization circuitry further to, responsive to no matching enqueued RAO instruction being detected, enqueue the incoming RAO instruction; and, responsive to a matching enqueued RAO instruction being detected, determine whether the incoming and matching RAO instructions have a same opcode to non-overlapping (Continued)

cache line elements, and, if so, spatially combine the incoming and matching RAO instructions by enqueuing both RAO instructions in a same group of cache line queue entries at different offsets.

21 Claims, 28 Drawing Sheets

(52) U.S. Cl.
CPC ........ *G06F 9/3017* (2013.01); *G06F 9/30047* (2013.01); *G06F 9/30145* (2013.01); *G06F 12/0875* (2013.01); *G06F 2212/452* (2013.01)

(58) Field of Classification Search
CPC ............... G06F 9/3017; G06F 12/0875; G06F 2212/452; G06F 9/30076; G06F 9/3009; G06F 9/4843
See application file for complete search history.

(56) References Cited

U.S. PATENT DOCUMENTS

| | | | | |
|---|---|---|---|---|
| 5,668,967 A * | 9/1997 | Olson | ................. | G06F 13/28 |
| | | | | 703/25 |
| 7,058,735 B2 | 6/2006 | Spencer | | |
| 7,624,221 B1 * | 11/2009 | Case | ................. | G06F 13/1626 |
| | | | | 710/18 |
| 9,250,914 B2 | 2/2016 | Hughes et al. | | |
| 9,418,009 B2 | 8/2016 | Moga et al. | | |
| 9,529,707 B2 * | 12/2016 | Nakamura | ............ | G06F 3/0689 |
| 2006/0090044 A1 | 4/2006 | Hillier et al. | | |
| 2006/0095691 A1 | 5/2006 | Bell et al. | | |
| 2014/0344653 A1 * | 11/2014 | Flinsbaugh | ............. | H04L 49/55 |
| | | | | 714/807 |
| 2015/0046655 A1 | 2/2015 | Engh-Halstvedt et al. | | |
| 2015/0269116 A1 | 9/2015 | Raikin et al. | | |
| 2019/0004810 A1 | 1/2019 | Jayasimha et al. | | |

OTHER PUBLICATIONS

Extended European Search Report for Application No. 18209326.0, dated May 17, 2019, 12 pages.
Notice of Allowance, U.S. Appl. No. 15/858,899, dated Oct. 23, 2019, 7 pages.
Intention to Grant, EP App. No. 18209326.0, dated Oct. 1, 2021, 6 pages.
Intention to grant, EP App. No. 18209326.0, dated Mar. 25, 2022, 8 pages.
Decision to grant a European patent, EP App. No. 18209326.0, dated Aug. 11, 2022, 2 pages.

* cited by examiner

421

| | | | Offset → | 60 | 56 | 52 | 48 | 44 | 40 | 36 | 32 | 28 | 24 | 20 | 16 | 12 | 8 | 4 | 0 |
|---|---|---|---|---|---|---|---|---|---|---|---|---|---|---|---|---|---|---|---|
| a | 0 | RAO | 0x0800 | | | | | 0 | | | | | | | | | | | |
| b | 10 | RAO | 0x0008 | | | | | | | | | | | | | 6 | | | |
| c | 20 | RAO | 0x0020 | | | | | | | | | | | 3 | | | | | |
| d | 15 | RAO | 0x2000 | | | | 4 | | | | | | | | | | | | |
| e | 5 | RAO | 0x0004 | | | | | | | | | | | | | | 5 | | |
| f | 4 | RAO | 0x0100 | | | | | | | | 1 | | | | | | | | |
| g | - | - | 0x0000 | | | | | | | | | | | | | | | | |
| h | 9 | RAO | 0x0004 | | | | | | | | | | | | | 2 | | | |

↑ Cache Line Base Address ↑ Countdown Timer ↑ Opcode ↑ Valid Mask

422

| | | | Offset → | 60 | 56 | 52 | 48 | 44 | 40 | 36 | 32 | 28 | 24 | 20 | 16 | 12 | 8 | 4 | 0 |
|---|---|---|---|---|---|---|---|---|---|---|---|---|---|---|---|---|---|---|---|
| a | 0 | RAO | 0x0800 | | | | | 0 | | | | | | | | | | | |
| b | 10 | RAO | 0x0008 | | | | | | | | | | | | | 6 | | | |
| c | 20 | RAO | 0x0020 | | | | | | | | | | | 3 | | | | | |
| d | 15 | RAO | 0x2000 | | | | 4 | | | | | | | | | | | | |
| e | 5 | RAO | 0x0004 | | | | | | | | | | | | | | 5 | | |
| f | 4 | RAO | 0x0100 | | | | | | | | 1 | | | | | | | | |
| g | 13 | ADD | 0x0800 | | | | | 55 | | | | | | | | | | | |
| h | 9 | RAO | 0x0004 | | | | | | | | | | | | | 2 | | | |

↑ Cache Line Base Address ↑ Countdown Timer ↑ Opcode ↑ Valid Mask

423

| | | | Offset → | 60 | 56 | 52 | 48 | 44 | 40 | 36 | 32 | 28 | 24 | 20 | 16 | 12 | 8 | 4 | 0 |
|---|---|---|---|---|---|---|---|---|---|---|---|---|---|---|---|---|---|---|---|
| a | 0 | RAO | 0x0800 | | | | | 0 | | | | | | | | | | | |
| b | 10 | RAO | 0x0008 | | | | | | | | | | | | | 6 | | | |
| c | 20 | RAO | 0x0020 | | | | | | | | | | | 3 | | | | | |
| d | 15 | RAO | 0x2000 | | | | 4 | | | | | | | | | | | | |
| e | 5 | RAO | 0x0004 | | | | | | | | | | | | | | 5 | | |
| f | 4 | RAO | 0x0100 | | | | | | | | 1 | | | | | | | | |
| g | 20 | ADD | 0x0840 | | | | | 55 | | | | | 33 | | | | | | |
| h | 9 | RAO | 0x0004 | | | | | | | | | | | | | 2 | | | |

↑ Cache Line Base Address ↑ Countdown Timer ↑ Opcode ↑ Valid Mask

FIG. 4C

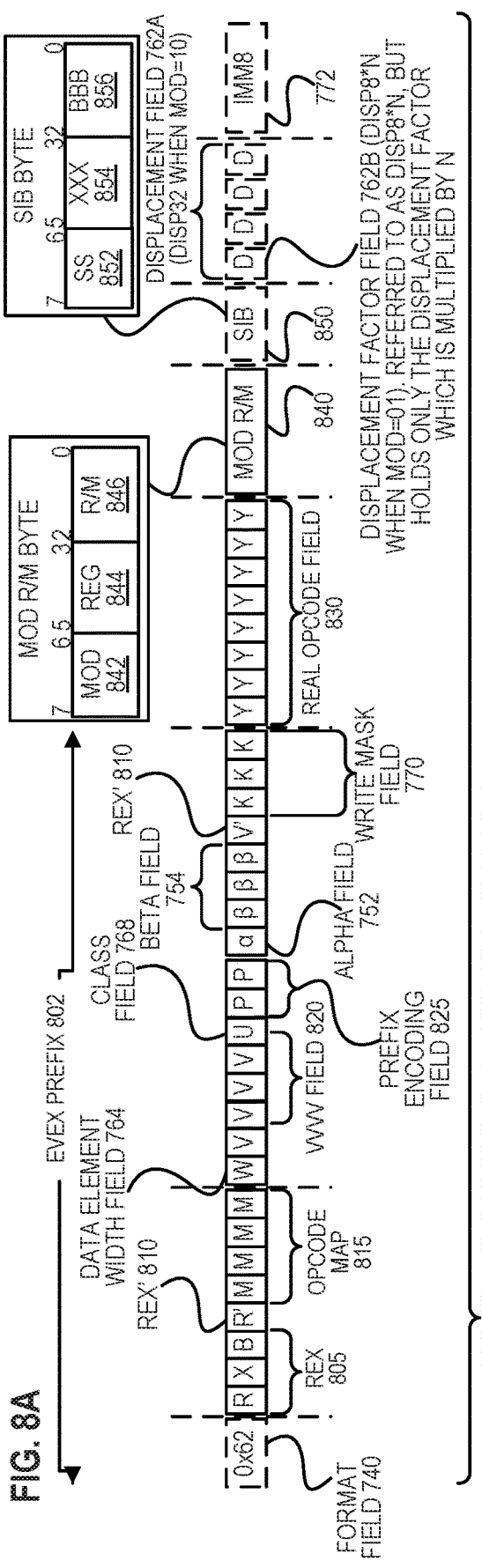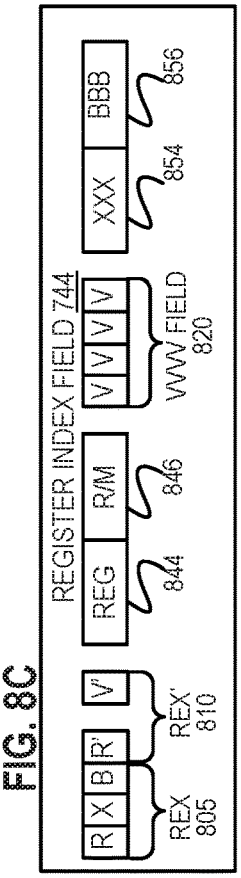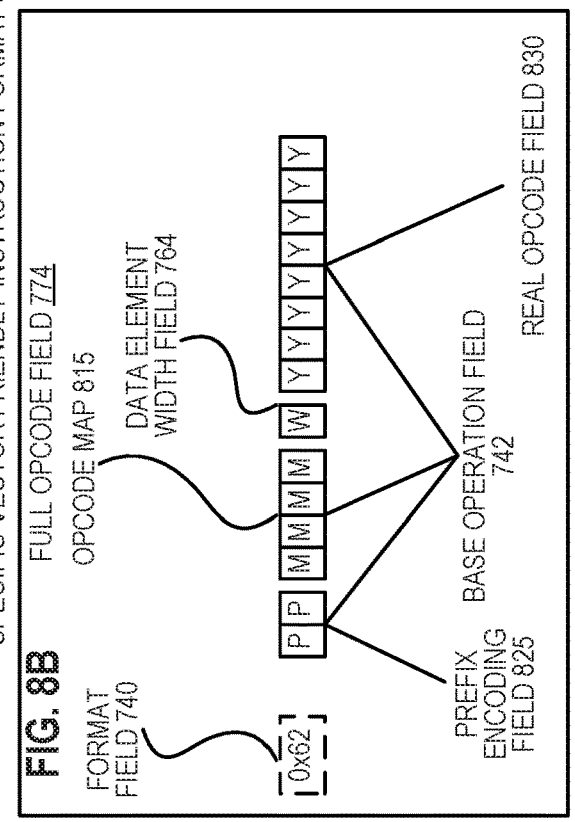

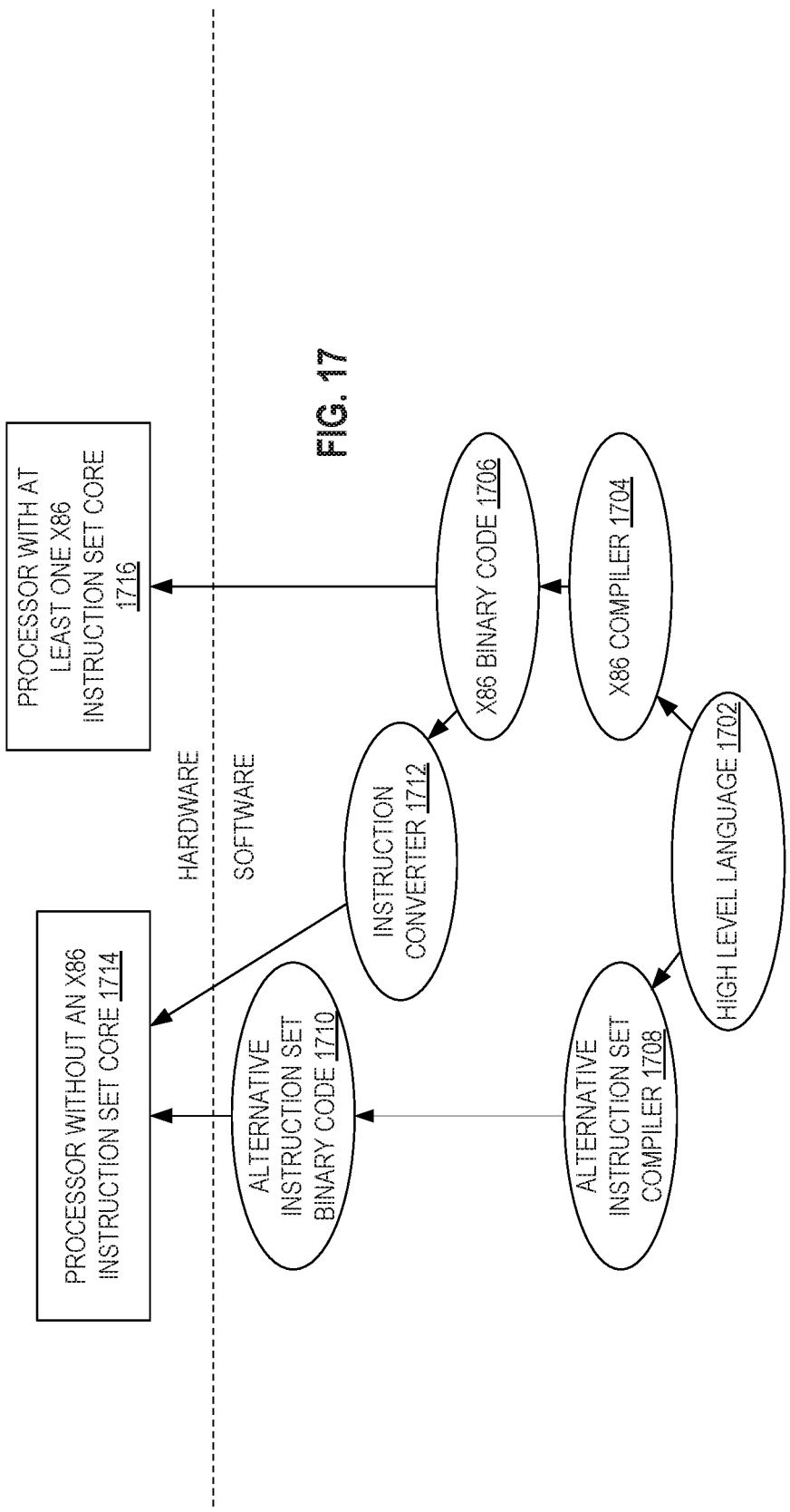

SPATIAL AND TEMPORAL MERGING OF REMOTE ATOMIC OPERATIONS

CROSS-REFERENCE TO RELATED APPLICATIONS

This application claims benefit under 35 U.S.C. § 120 as a continuation of U.S. application Ser. No. 15/858,899, filed Dec. 29, 2017, which is hereby incorporated by reference.

FIELD OF INVENTION

The field of invention relates generally to computer processor architecture and, more specifically, to spatial and temporal merging of remote atomic operations.

BACKGROUND

An atomic memory operation is a memory access operation during which a processor core reads a location, modifies it, and writes it back in what appears to other cores as a single bus operation. Atomic memory operations typically are performed inside a processing core. However, some processors or systems may support the execution of atomics outside of a core, in which case they can be referred to as remote atomic operations (RAOs). RAOs are useful in a diverse set of applications, including packet processing, high-performance computing, machine learning, and, more generically, in dynamic scheduling algorithms, to name a few.

Posted RAOs, also called fire-and-forget atomics, are a class of RAO instructions that return no architectural information to software; they instruct the hardware to perform an atomic read-modify-write operation, but do not use a return result into a register. Posted RAO instructions are weakly ordered, to allow the core to offload the operations (e.g., to cache control circuitry) and continue execution.

Unfortunately, execution of RAOs, posted or otherwise, can suffer inefficiencies, especially when a single thread executes multiple RAOs in quick succession to the same cache line. The multiple RAO instructions may be serialized, forcing each one to finish and receive acknowledgement of completion before the next in the sequence can begin execution.

BRIEF DESCRIPTION OF THE DRAWINGS

The present invention is illustrated by way of example and not limitation in the figures of the accompanying drawings, in which like references indicate similar elements and in which:

FIG. 4C is a block diagram illustrating request queues to store remote atomic operations, according to some embodiments;

FIG. 7A is a block diagram illustrating a generic vector friendly instruction format and class A instruction templates thereof according to embodiments of the invention;

FIG. 7B is a block diagram illustrating the generic vector friendly instruction format and class B instruction templates thereof according to embodiments of the invention;

FIG. 8A is a block diagram illustrating an exemplary specific vector friendly instruction format according to embodiments of the invention;

FIG. 8B is a block diagram illustrating the fields of the specific vector friendly instruction format that make up the full opcode field according to one embodiment of the invention;

FIG. 8C is a block diagram illustrating the fields of the specific vector friendly instruction format that make up the register index field according to one embodiment of the invention;

FIG. 11A is a block diagram of a single processor core, along with its connection to the on-die interconnect network and with its local subset of the Level 2 (L2) cache, according to embodiments of the invention;

FIG. 11B is an expanded view of part of the processor core in FIG. 11A according to embodiments of the invention;

FIG. 13 is a block diagram of a system in accordance with one embodiment of the present invention;

FIG. 14 is a block diagram of a first more specific exemplary system in accordance with an embodiment of the present invention;

FIG. 15 is a block diagram of a second more specific exemplary system in accordance with an embodiment of the present invention;

FIG. 16 is a block diagram of a System-on-a-Chip (SoC) in accordance with an embodiment of the present invention; and FIG. 17 is a block diagram contrasting the use of a software instruction converter to convert binary instructions in a source instruction set to binary instructions in a target instruction set according to embodiments of the invention.

DETAILED DESCRIPTION

Figure 1:
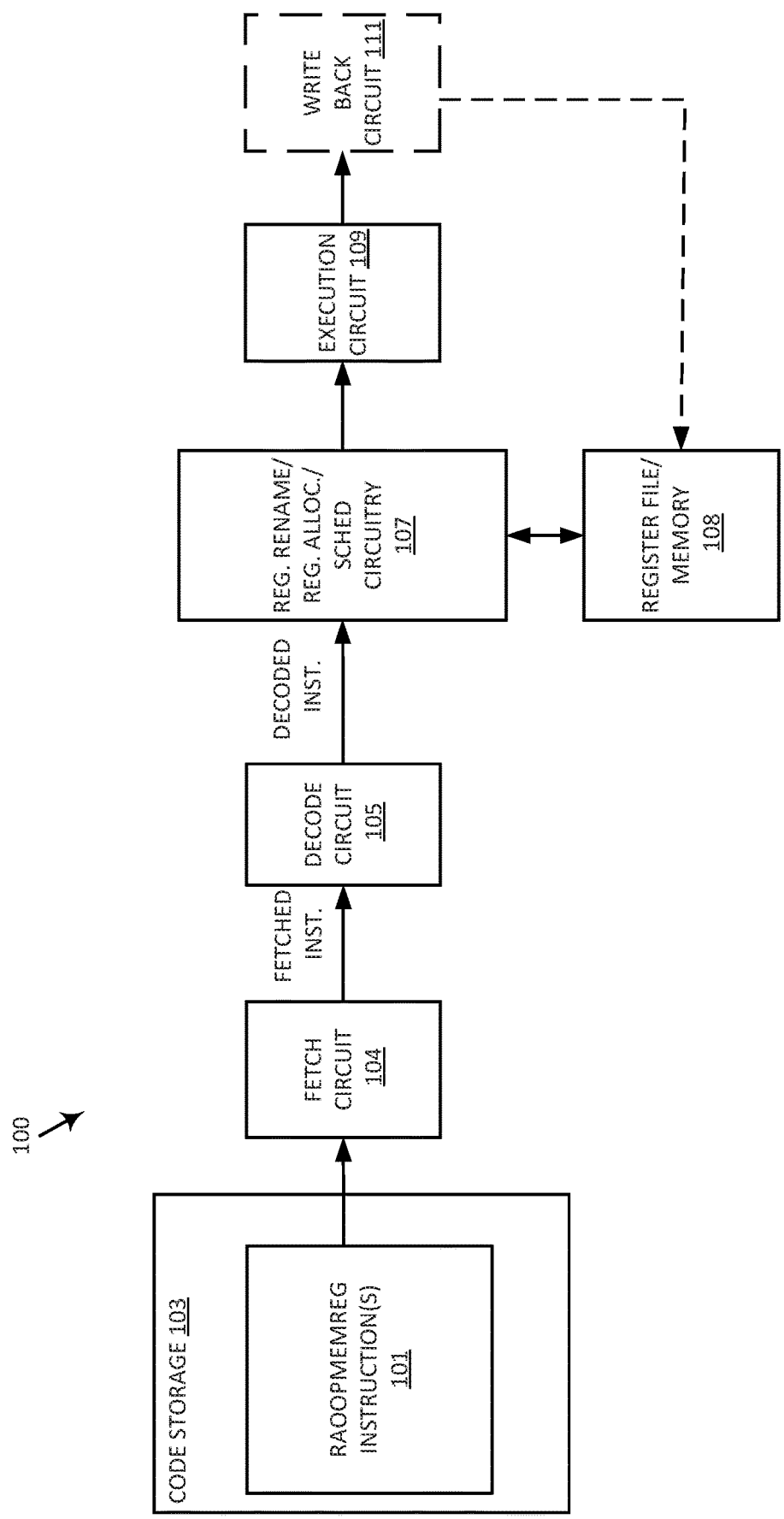
FIG. 1 is a block diagram illustrating processing components for executing instructions for remote atomic operations, according to some embodiments.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments disclosed herein improve the efficiency and reduce the cost of executing RAO instructions by detecting and taking advantage of opportunities to spatially and/or temporally combine multiple RAO instructions. As used herein, spatial combining refers to combining multiple RAO instructions to different addresses within a same cache line, for example, combining a first RAO instruction that accesses a second element of a cache line with a second RAO instruction that accesses a tenth element of a cache line. Temporal combining refers to combining, when possible, multiple RAO instructions that successively access the same cache line location, for example, combining a first RAO instruction that adds '33' to an addressed location with a second RAO instruction that adds '11' to the addressed location into a single RAO instruction that adds '44' to the addressed location.

Embodiments disclosed herein support a family of atomic memory instructions compatible with an x86 processor. As used herein, an x86 processor refers to a processor manufactured by one of several different companies, and which is compatible with an x86 instruction set architecture (ISA). Each instruction performs an atomic update operation (e.g., read-modify-write) on a memory location. The memory accesses could be weakly ordered with respect to other instructions from the same thread, in a similar manner to x86 non-temporal (NT) stores. The instructions do, however, honor traditional data hazards—read-after-write, write-after-read and write-after-write dependencies with instructions from the same thread. The instructions may be executed in a variety of locations, such as: at the processor core, at a private cache, at the shared cache or caching and home agent (CHA), at the memory controller, or at a remote core. In some embodiments, each instruction is to perform parallel operations on elements of a vector stored in memory.

Disclosed embodiments offer an advantage of allowing a processing core to dispatch an RAO instruction for execution by a cache control circuit, and to continue to perform useful work while the cache control circuit performs the RAO instruction. The core must still track outstanding RAO instructions, at least in order to enforce fences and dependences within a thread (e.g., a read-after-write to the same memory location). But as long as the core is performing RAO instructions to different cache lines, then until/unless the core fills up its tracking capacity, or saturates the cache control circuitry with requests, the core can execute these RAO instructions with very high throughput. Even though RAO instructions individually may have high latency (they must go from the core to the cache control circuitry, read the memory location, perform the operation, write back the memory location, and return an acknowledgement to the core), the latency can be substantially hidden by overlapping it with other useful work.

Disclosed embodiments attempt to reduce serialization of multiple RAO instructions, allowing applications to more efficiently perform multiple atomic operations to the same cache line back-to-back, or in quick succession. Disclosed embodiments reduce instances of multiple RAO instructions to the same cache line being serialized, which would force a core to wait for a reply from the cache control circuitry for each one, stalling execution potentially for tens or hundreds of cycles. Since RAO instructions may go all the way to a centralized agent (such as the cache control circuitry) and back, even for data in a local cache, serializing them can be expensive. Disclosed embodiments advantageously include hardware to automatically combine RAO instructions to the same cache line.

Some embodiments spatially combine multiple RAO updates to several different locations on the same cache line. This may happen by chance (e.g., due to a particular input pattern), or it may be inherent to the algorithm. For example, software may issue multiple RAO instructions to update multiple fields of a single object, such as a structure in the C programming language. As a concrete example, a physical simulation application may be computing the total force on a set of objects, represented as an array of C structures, struct {float x, y, z;} force[num]. This often follows the following pattern:

```
for each object, ob {
    for each neighbor object, neigh {
        (fx, fy, fz) <= compute force (ob, neigh)
```

-continued

```
        atomic add (&force[neigh].x, fx)
        atomic add (&force[neigh].y, fy)
        atomic add (&force[neigh].z, fz)
    }
}
```

Note that the individual updates to x, y, and z are independent (i.e., they can be executed with weak ordering and there is no need to lock the whole structure). Disclosed embodiments avoid serializing the individual updates, and instead seize on an opportunity to spatially combine two or more of these atomic operations together.

In a related scenario, some software may perform multiple atomic updates to the exact same location in quick succession. Some disclosed embodiments opportunistically temporally combine these operations, for example, by converting 20 atomic increments of the same location into an atomic addition of 20.

More specifically, disclosed embodiments include hardware to take advantage of spatial and/or temporal combining of RAO instructions to a same cache line. Some embodiments include optimization circuitry not only in each processing core, where the RAO instructions are generated, but also in a separate execution circuit, such as a cache control circuit, where the atomic operation is actually performed.

In some embodiments, an RAO instruction queue in the core tracks pending RAO instructions, on a per-cache-line basis. In some embodiments, a cache line is 64-bytes wide, and is accessed via a 4-byte-wide data path. In other embodiments, the size of the cache line and the access data path can vary, without limitation. In some embodiments, entire cache lines are accessed substantially at once using a burst of reads or writes. Each cache line of pending, enqueued RAO instructions can thus be read or written using burst reads or writes. When every 4-byte element of a 64-byte cache line is to be accessed, a burst of 16 reads or writes can be used to access the entire cache line. When only part of a cache line needs to be accessed, fewer than sixteen accesses can be used.

In some embodiments, the RAO instruction queue makes use of a processor's existing write combining buffer (WCB). The WCB already includes some useful capabilities, such as tracking streaming stores via buffer entries containing a cache line (64B) of data and the cache line address. Some embodiments make use of the WCB (or analogous structure) to buffer posted RAO instructions, since posted RAO instructions have very similar memory ordering (weak ordering) as streaming stores.

Disclosed embodiments, however, extend each buffer entry to include some additional fields: a valid mask to indicate to which elements in the cache line the RAO instruction should be applied, an opcode specifying the RAO instruction (e.g., integer addition), a data element size for the RAO instruction, and a timeout counter to invalidate the buffer entry after passage of a predetermined number of cycles (or an expiration timestamp to invalidate the buffer entry when a current cycle count reaches the expiration timestamp).

In some embodiments, when a core executes a posted RAO instruction, it scans the RAO instruction queue to determine whether a posted RAO instruction is already outstanding for the cache line. If not, there is no combining opportunity, and the core instead allocates a new buffer entry and fills its fields. The core does not immediately send the RAO instruction to the uncore, since that would prevent all opportunities of combining future operations with this one. Instead, the core sets the timeout value to some initial value (e.g., 20 cycles) that decreases every cycle, and only when the counter expires will the core send the RAO instruction to the uncore.

On the other hand, if a buffer entry exists for the same addressed cache line, the core determines the overlap between the new RAO instruction and the existing, enqueued RAO instruction. The degree of overlap is gauged by comparing the two RAO instructions' opcodes, data element sizes, and valid masks. (The valid mask could take different forms. For example, some embodiments explicitly encode the element size, and each mask bit could correspond to one element. Or each mask bit may refer to the minimum data element size, which could be bytes, words, or doublewords.)

If there is no overlap, then embodiments that support spatial combining write the new RAO instruction operands into the appropriate places in the existing RAO instruction queue entry, including the new RAO instruction's opcode, the source data, a data element size, destination address, a valid mask, and an expiration timestamp.

If there is overlap, for example when new and existing RAO instructions specify a same opcode (e.g., ADD) to a same cache line element (e.g., 4th element) and with a same data element size (e.g., four bytes), then embodiments that support temporal combining read the appropriate portions of the RAO instruction queue, perform the specified arithmetic or logical operation specified by the RAO instructions on the data from the buffer and the data from the new RAO instruction, and write the result into the data buffer (e.g., combine RAO_ADD 33 with RAO_ADD 11 and store RAO_ADD 44 to the RAO instruction queue). During this process, the hardware ensures atomicity of the contents of the buffer, in case the core attempts to simultaneously perform other operations on the same cache line (for the same thread or a different hyperthread on the core). As another example, when new and existing RAO instructions specify a same opcode and a same data element size, but to different cache line elements, then embodiments that support spatial combining read the cache line entry containing the existing RAO requests from the RAO request queue, add the new RAO operations to the appropriate elements of the cache line entry, and write the updated cache line entry back to the RAO request queue.

If there is partial overlap (e.g., RAO instructions that have different, but compatible opcodes, such as 20 increment requests followed by 5 integer-add requests), some embodiments perform special processing, such as more aggressively combining RAO instructions having different opcodes and/or operand sizes. Some embodiments convert certain opcodes into other, more general ones. For example, since integer addition is a more general form of increment, if an RAO instruction in a buffer is an increment, and a new operation is an integer addition, the hardware in some embodiments converts the buffer entry to an integer addition operation, and inserts data values of 1 in the appropriate places in the data portion of the buffer entry, and therefore allows the new operation to merge with the buffer entry.

Some embodiments combine a word-sized RAO instruction with a doubleword-sized RAO instruction, as long as those two RAO instructions do not access any same cache line elements.

More complex embodiments may comprise buffer entries containing multiple opcodes, data element sizes, and/or valid masks, and may be able to combine different RAO instructions, such as single-precision floating point addition and integer decrement of a word.

At the cache control circuit (or wherever the RAO instructions actually act on memory), for a baseline RAO implementation, the logic that receives requests from the core will decode an RAO instruction, read the specified address from the local memory/cache, perform the specified operation on that address using an operand from the RAO instruction, write the result back to memory, and signal completion back to the requesting core.

In some embodiments, the cache control circuitry is enhanced to be able to receive and decode spatially and/or temporally combined RAO instructions from a core. To support spatially combined RAO instructions, the cache control circuitry, rather than receiving a single address of a cache line data element, accepts RAO instructions from the core that contain a cache line address and a valid mask indicating which cache line elements are to be updated. The cache control circuitry will read the cache line once, iteratively (or in parallel) perform the specified operation or operations (e.g., ADD 5) on all enabled elements, write the result back to the cache, and signal completion back to the requesting core. In some embodiments, in addition to the valid mask, the cache control circuitry also accepts a source data vector containing source operands to be used when updating each element of the destination cache line.

In some embodiments, two or more processor cores share a mid-level cache (e.g., an L2 cache in a hierarchy that includes L1, L2, and L3 caches) control circuit that incorporates an instance of optimization circuitry and an instance of RAO instruction queue, as described herein. The incorporated instance of optimization circuitry, as described in embodiments, is to identify and take advantage of opportunities to spatially and/or temporally combine incoming RAO instructions. The circuitry in such embodiments operates similarly to the combining circuitry included within the core and within the cache control circuitry, as described above and herein. If no opportunities to combine are detected, the mid-level cache control circuit buffers them in its instance of the RAO request queue, and delays sending them on for a number of timeout cycles, to allow some time for another request to come in to the same line, such that the circuitry temporally and/or spatially combines the requests.

FIG. 1 illustrates an embodiment of hardware to process an RAO instruction. As illustrated, storage 103 stores an RAOOPMEMREG instruction 101 to be executed. The instruction is received by decode circuit 105. For example, decode circuit 105 receives this instruction from fetch circuit 104. The instruction 101 includes fields for an opcode, a destination memory identifier to specify a memory destination, a destination register identifier to specify a register destination, and source data to specify a source location. Decode circuit 105 decodes the instruction into one or more operations. In some embodiments, this decoding includes generating a plurality of micro-operations to be performed by execution circuit (such as execution circuit 109). The decode circuit 105 also decodes instruction prefixes (if used).

In some embodiments, register renaming, register allocation, and/or scheduling circuit 107 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuit out of an instruction pool (e.g., using a reservation station in some embodiments).

Registers (register file) and/or memory 108 store data as operands of the instruction to be operated on by execution circuit. Exemplary register types include packed data registers, general purpose registers, and floating point registers.

Execution circuit 109 executes the decoded RAOOP-MEMREG instruction. An embodiment of an execution circuit is shown and described below, including with respect to FIG. 5 and FIGS. 10A-B, and is one embodiment of execution circuit 109. Write back circuit 111 commits the result of the execution of the decoded RAOOPMEMREG instruction.

Figure 2:
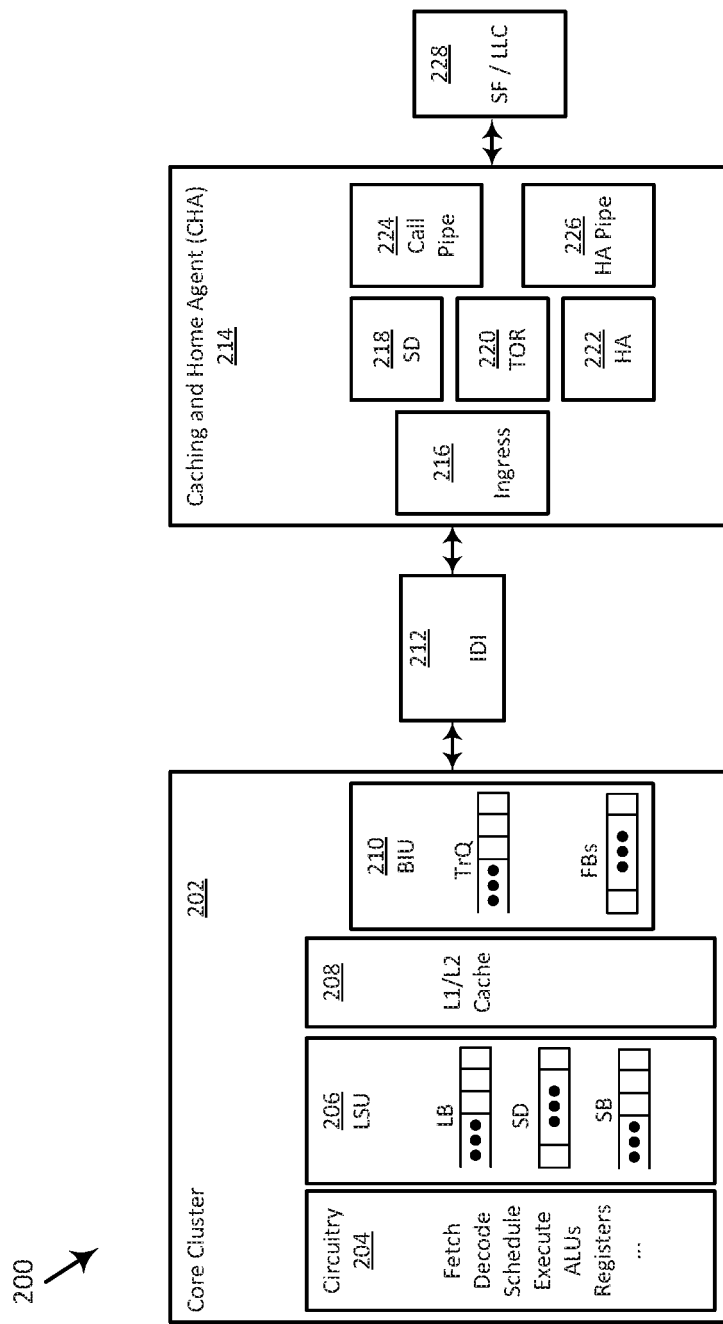
FIG. 2 is a block flow diagram of a processor core and cache control circuitry to execute an instruction for a remote atomic operation, according to some embodiments.

FIG. 2 is a block diagram illustrating portions of a multi-core processor that can be used to perform RAO instructions. As shown, processor 200 includes core cluster 202, which includes circuitry 204, which includes fetch, decode, scheduling, execution, arithmetic-logic units (ALUs), and registers. Core cluster 202 also includes load/store unit (LSU) 206, level 1/level 2 (L1/L2) caches 208, and bus interface unit 210 (BIU). Processor 200 also includes caching and home agent (CHA) 214, which includes ingress 216, store data buffer (SD) 218, table of requests (TOR) 220, home agent (HA) 222, call pipe 224, and home agent (HA) pipe 226. Intra die interconnect (IDI) 212 couples core cluster 202 to CHA 214. Also shown are snoop filter (SF)/last level cache (LLC) 228, with which CHA 214 communicates in order to service the RAO instruction.

Figure 3:
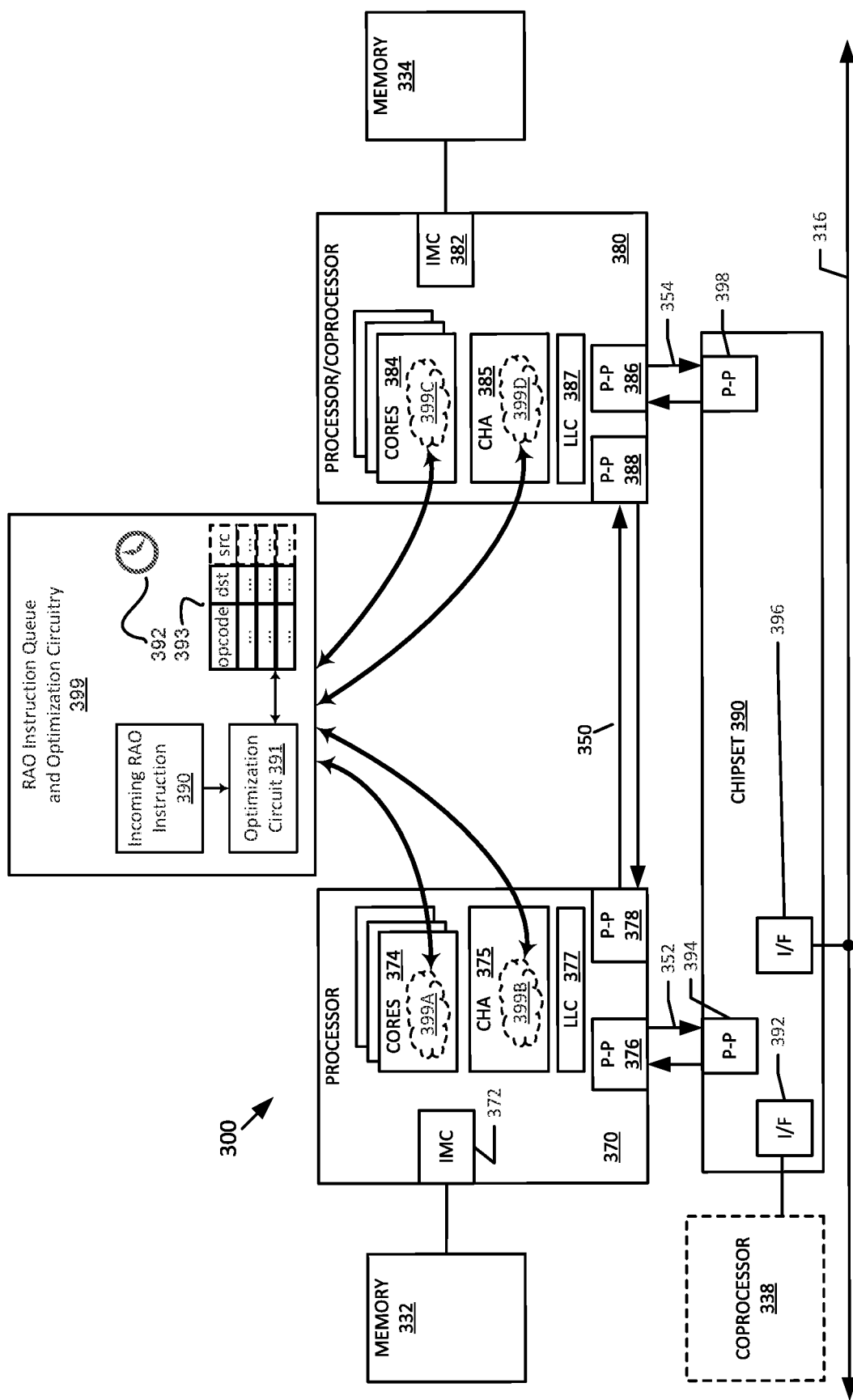
FIG. 3 illustrates portions of a multi-processor system for executing instructions for remote atomic operations, according to some embodiments.

FIG. 3 illustrates portions of a multi-processor system for executing instructions for remote atomic operations, according to some embodiments. As shown, processors 370 and 380 include integrated memory and I/O control logic ("IMC") 372 and 382, respectively. Processor 370 and processor 380 each includes one or more cores 374 and 384, caching and home agent (CHA) 375 and 385, last level cache (LLC) 377 and 387, and point-to-point interfaces 376, 378, 388, and 386. System 300 further includes chipset 390, which includes point-to-point interfaces 394 and 398 and high-performance interfaces 392 and 396 to communicate with bus 316 and optional coprocessor 338.

Also shown is RAO instruction queue and optimization circuitry 399 to process incoming RAO instructions according to embodiments disclosed herein. Incoming RAO instruction 390 is held in a buffer, register, or other intermediate memory location to be accessed by optimization circuit 391. In operation, optimization circuit 391 processes the incoming RAO instruction 390, for example as illustrated and described with respect to FIGS. 4A-4J and FIG. 5. As shown, RAO instruction queue 393 is organized on a cache line basis, and stores RAO instructions, each having an opcode, a destination, and optional source data. In some embodiments, each RAO instruction queue entry further includes a valid mask and an expiration timestamp to be used according to some disclosed embodiments discussed below.

In some embodiments, as shown, RAO instruction queue and optimization circuitry 399 also includes a regularly incrementing system counter 392 to be used in various embodiments disclosed herein, for example with respect to FIGS. 4A-4J and FIG. 5.

As illustrated, system 300 includes multiple optional instances, 399A-D, of RAO instruction queue and optimization circuitry 399, with each instance to process incoming RAO instructions and take advantage of opportunities to improve system performance by spatially and/or temporally combine incoming RAO instructions with enqueued RAO instructions. instruction queue and optimization circuitry instances 399A-D are optional, as indicated by their dashed borders, insofar as one or more might not be included in some implementations. As illustrated, every instance 399A-D of RAO instruction queue and optimization circuitry 399 includes an RAO instruction queue and optimization circuitry. It is to be understood, however, that each of the instances 399A-D is to be customized according to where it is implemented to take advantage of opportunities to spatially and temporally combine RAO instructions.

The format of the incoming and enqueued RAO instructions is discussed further below with respect to FIG. 6, FIGS. 7A-B, and FIGS. 8A-D.

System 300 includes additional components, for example as illustrated and discussed with respect to FIG. 12 to FIG. 15, that, for clarity, are not shown in FIG. 3.

In embodiments disclosed herein, an RAO instruction can be executed in multiple different circuits in the system. In some embodiments, the RAO instruction is executed by a cache control circuit, such as circuitry within CHA 214 (FIG. 2), CHA 375 or CHA 385 (FIG. 3), circuitry within a chipset such as chipset 390 (FIG. 3), or circuitry within a remote processor, such as coprocessor 338 (FIG. 3). In some embodiments, the location where the remote atomic operation is to be executed is selected, for example, by selection circuitry 107 (FIG. 1).

In some embodiments, the selected execution circuit reflects a static selection, for example as selected by a hardware designer who is designing system 300. Each of the multiple processor cores 374 and 384 can be associated with a caching home agent (CHA), for example CHA 375 and CHA 385, which is to execute the remote atomic instruction.

In other words, in some embodiments, the location where the remote atomic operation is to be executed is to be chosen statically by the hardware designer. In some embodiments, the location where the remote atomic operation is to be executed is to be chosen statically by software. In some embodiments, the location where the remote atomic operation is to be executed is to be chosen dynamically by software. In some embodiments, the location where the remote atomic operation is to be executed is to be chosen statically as controlled by each instruction including an immediate to indicate where to execute the instruction.

In some embodiments, the processor is to include a software programmable control register to be set by software to indicate where RAO instructions should be executed.

In some embodiments, the processor is to include separate software programmable control registers to be set by software for different instructions (e.g., ADD and CMPXCHG) or different groups of instructions to indicate where the RAO instruction is to be executed.

In some embodiments, the processor is to use some information from hardware to predict the best location to execute an RAO instruction. In such embodiments, the processor is to use both the information received from the hardware and the controls provided by software (e.g., as part of the instruction, as a control register, or as part of a page table entry) to determine where to execute the RAO instruction. In such embodiments, the controls provided by the software are more like a hint than they are a directive. In some embodiments, a property is added to page table entry indicating where RAO instructions directed to those addresses should be executed.

Multi-processor systems for executing remote atomic operations according to embodiments disclosed herein are further illustrated and discussed below with respect to FIG. 13 to FIG. 17.

Figure 4A:
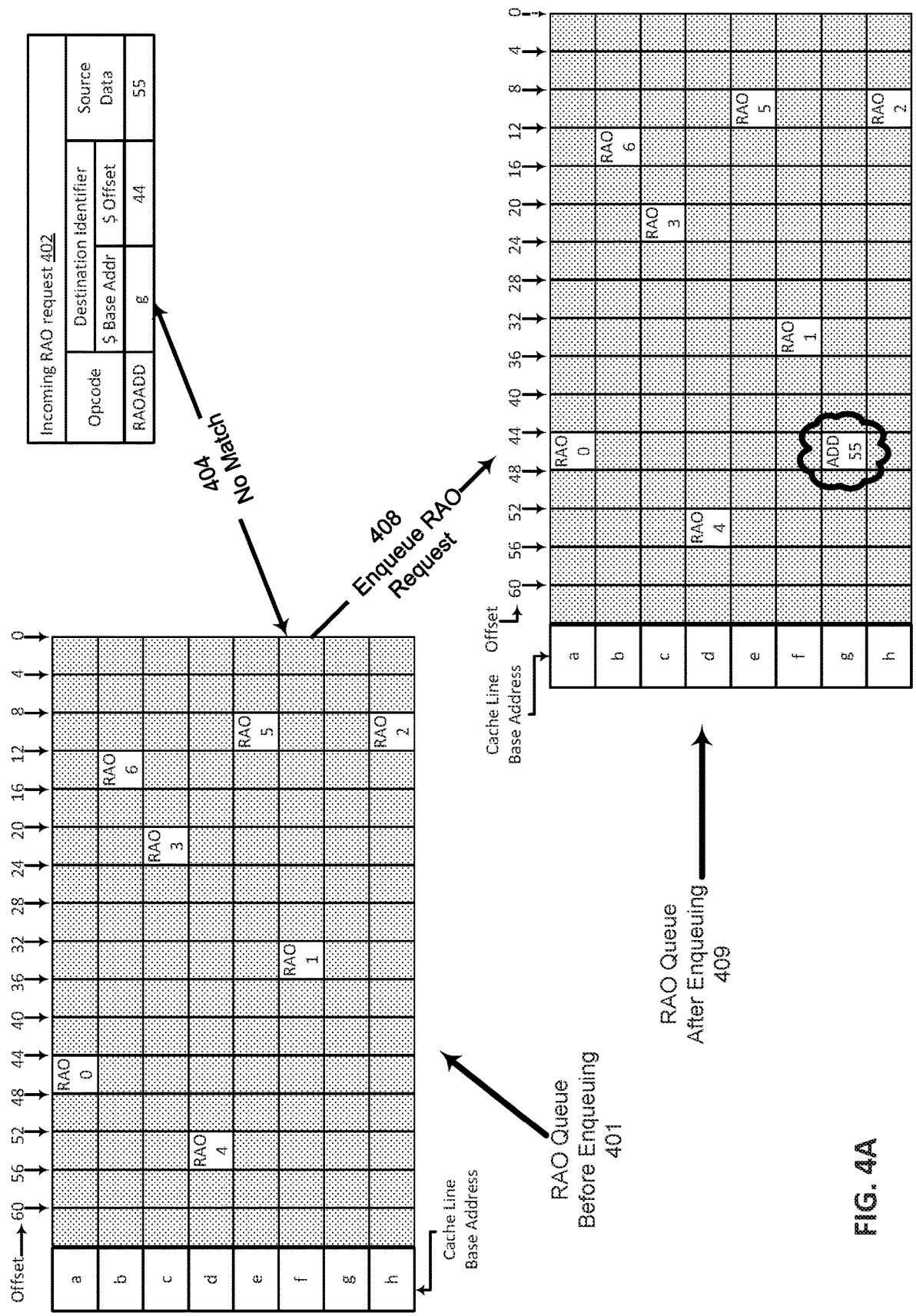
FIG. 4A is a block flow diagram illustrating enqueuing a remote atomic operation instruction, according to some embodiments.

FIG. 4A is a block flow diagram illustrating enqueuing a remote atomic operation instruction, according to some embodiments. As shown, RAO instruction queue before enqueueing 401 is a data structure that stores enqueued RAO instructions. Each queue entry includes an RAO instruction addressed to a particular cache line element. In some embodiments, each element includes a memory address, including a cache line base address and a cache line offset. Each entry further includes the specified RAO opcode, and source data, if any.

Each element further includes a timeout counter (or expiration timestamp) that is set to an initial value when the RAO instruction is added to the queue, and allows time to identify an opportunity to combine. The timeout counter can be set statically to a predetermined value by software, or can be set dynamically based on historical combination statistics. The timeout counter is also sometimes referred to as an expiration timestamp, wherein an enqueued RAO instruction can benefit from opportunities to combine up until the time that a regularly incrementing system counter reaches and exceeds the expiration timestamp. In some embodiments, the expiration timestamp associated with an RAO instruction queue entry for a given cache line is set to the predetermined value upon modification to any part of the given cache line, for example, when an enqueued RAO instruction to a particular cache line element is combined with an incoming RAO instruction to the particular cache line.

RAO instruction queue 401 is shown as being organized in tabular form, with each row representing a 64-byte cache line and each column representing a 4-byte cache line element. In some embodiments, RAO instruction queue 401 maintains a separate RAO opcode for each cache-line element, allowing different operations to occur on different elements. In some embodiments, a separate timeout counter is maintained for each cache line element. A possible implementation of RAO instruction queue 401 is illustrated and described in FIG. 4C, in which RAO instruction queue 421 does not yet have any RAO requests to cache line address 'g' in the queue. Disclosed embodiments can choose various implementations, cache line sizes, and element sizes, without limitation. RAO instruction queue 401 can be stored in registers or in memory, without limitation. In some embodiments, RAO instruction queue 401 is stored in a content-addressable memory to allow for efficient searches for specific cache line addresses.

As shown in FIG. 4A, incoming RAO instruction 402 specifies that a value of '55' be ADDed to the element at byte 44 of the cache line with base address equal to 'g'. At 404, enqueue circuitry determines whether any RAO instructions to cache line 'g' are already pending in the queue. Since there are no pending RAO instructions to cache line 'g', there are no opportunities to combine RAO instructions. Rather than immediately forward the incoming RAO instruction 402 to cache control circuitry, the enqueue circuit at 408 adds the incoming request to the queue, and sets a timeout counter to allow some time to await combination opportunities. The updated RAO instruction queue after enqueuing at 409 shows the incoming request having been added to the queue. A possible implementation of RAO instruction queue 409 is illustrated and described in FIG. 4C, in which RAO instruction queue 422 maintains the RAO ADD instruction to cache line g, offset 44, a timeout counter of 13, with source data equal to 55, and the valid mask equal to 0x0800. Operation then continues awaiting temporal and spatial RAO instruction merging opportunities.

Figure 4B:
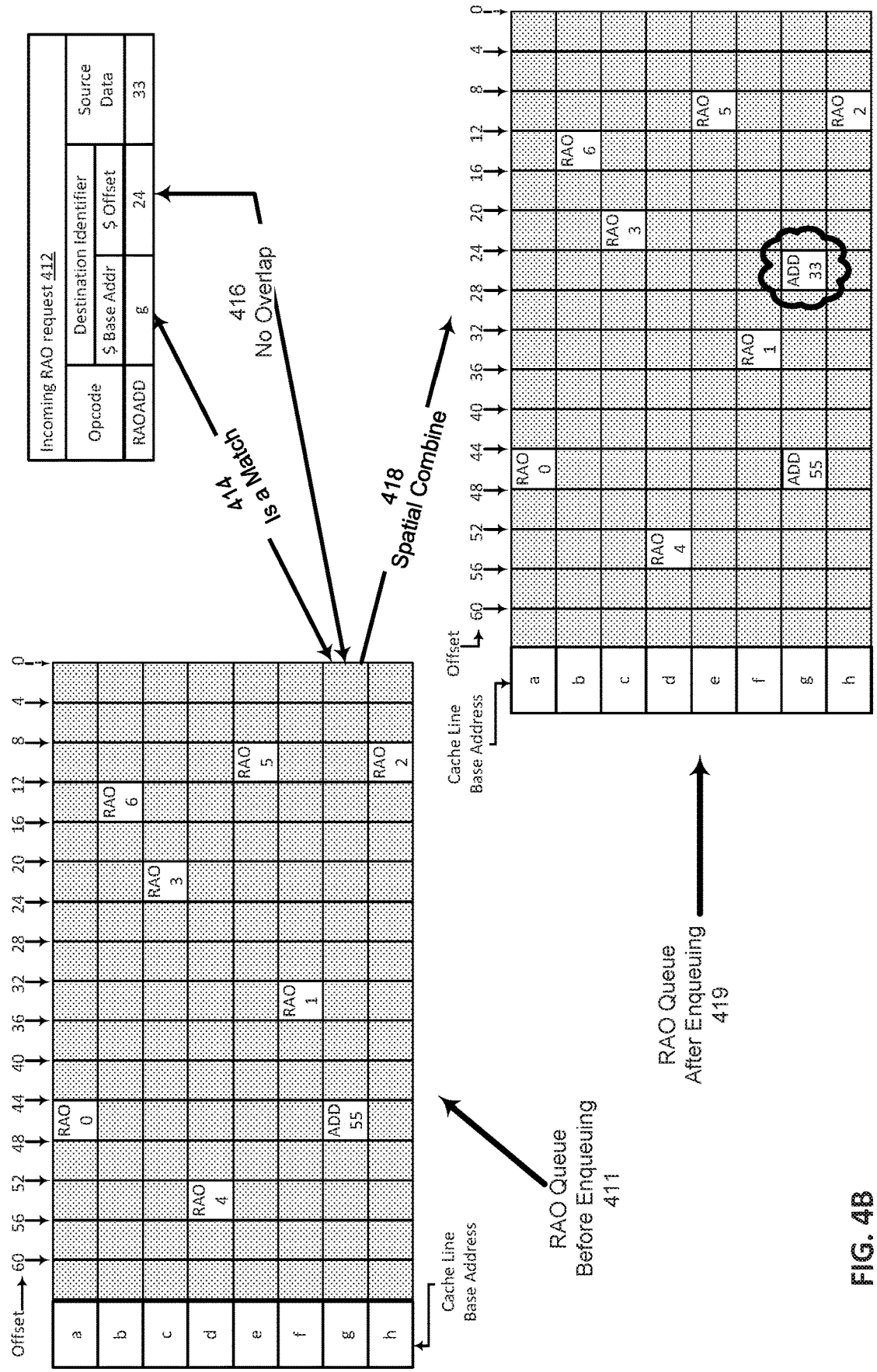
FIG. 4B is a block flow diagram illustrating spatially combining a remote atomic operation instruction with existing, queued entries, according to some embodiments.

FIG. 4B is a block flow diagram illustrating enqueue circuitry spatially combining an incoming RAO instruction with existing, enqueued entries of an RAO instruction queue, according to some embodiments. As shown, RAO instruction queue before enqueueing 411 is a data structure that stores enqueued RAO instructions. Each queue entry includes an RAO instruction addressed to a particular cache line element. In some embodiments, each element includes a memory address, including a cache line base address and a cache line offset. Each entry further includes the specified RAO opcode, and source data, if any.

Each element further includes a timeout counter (or expiration timestamp) that is set to an initial value when the RAO instruction is added to the queue, and allows time to identify an opportunity to combine. The timeout counter can be set statically to a predetermined value by software, or can be set dynamically based on historical combination statistics.

RAO instruction queue 411 is shown as being organized in tabular form, with each row representing a 64-byte cache line and each column representing a 4-byte cache line element, disclosed embodiments can choose various implementations, cache line sizes, and element sizes, without limitation. RAO instruction queue 411 can be stored in registers or in memory, without limitation. In some embodiments, RAO instruction queue 411 is stored in a content-addressable memory to allow for efficient searches for specific cache line addresses.

As shown, incoming RAO instruction 412 specifies that a value of '33' be ADDed to offset 24 of the cache line with base address equal to 'g'. At 414, enqueue circuitry determines whether any RAO instructions to cache line 'g' are already pending in the queue. There are, and at 416, enqueue circuitry determines a degree of overlap between incoming RAO instruction 412 and existing enqueued RAO instructions to cache line 'g'. Finding no overlap between the incoming and matching RAO instructions, enqueue circuitry at 418 spatially combines the incoming and existing RAO instructions to cache line 'g', which is now shown as having a pending 'ADD 55 to offset 44' RAO instruction and a pending 'ADD 33 to offset 24' RAO instruction. Rather than immediately forward the enqueued RAO instructions to cache line 'g' to cache control circuitry, the enqueue circuit in some embodiments at 418 adds the incoming request to the queue, sets a timeout counter for the RAO queue entry at offset '24,' and resets the timeout counter for the RAO queue entry at offset '44' to a new value to allow some time to await combination opportunities. The updated RAO instruction queue after enqueuing at 419 shows the incoming request having been added to the queue. A possible implementation of RAO instruction queue 419 is illustrated and described in FIG. 4C, in which RAO instruction queue 423 is shown maintaining an ADD '55' to offset 44 as well as an ADD '33' to offset 24 of cache line address 'g', with a valid mask equal to 0x0840. Operation then continues, awaiting temporal and spatial RAO instruction merging opportunities.

The embodiment of optimization circuitry disclosed in FIG. 4B thus improves the efficiency and reduces the cost of executing RAO instructions by detecting and taking advantage of opportunities to spatially combine multiple RAO instructions. Some embodiments include the optimization circuitry not only in each processing core, where the RAO instructions are generated, but also in a separate execution circuit, such as a cache control circuit, where the atomic operation is actually performed. Even though RAO instructions individually may have high latency (they must go from the core to the cache control circuitry, read the memory location, perform the operation, write back the memory location, and return an acknowledgement to the core), the latency can be substantially hidden by overlapping it with other useful work.

FIG. 4C is a block diagram illustrating request queues to store remote atomic operations, according to some embodiments. A possible implementation of RAO instruction queue 401 (FIG. 4A) is illustrated and described in FIG. 4C, in which RAO instruction queue 421 does not yet have any RAO requests to cache line address 'g' in the queue. A possible implementation of RAO instruction queue 409 (FIG. 4A) is illustrated and described in FIG. 4C, in which RAO instruction queue 422 maintains the RAO ADD instruction to offset 44, a timeout counter of 13, with source data equal to 55, and the valid mask equal to 0x0800. A possible implementation of RAO instruction queue 419 (FIG. 4B) is illustrated and described in FIG. 4C, in which RAO instruction queue 423 is shown maintaining an ADD '55' to offset 44 as well as an ADD '33' to offset 24 of cache line address 'g', with a valid mask equal to 0x0840. Each of RAO instruction queues 421, 422, and 423 can be stored in registers or in memory, without limitation. In some embodiments, one or more of RAO instruction queues 421, 422, and 423 is stored in a content-addressable memory to allow for efficient searches for specific cache line addresses.

Figure 4D:
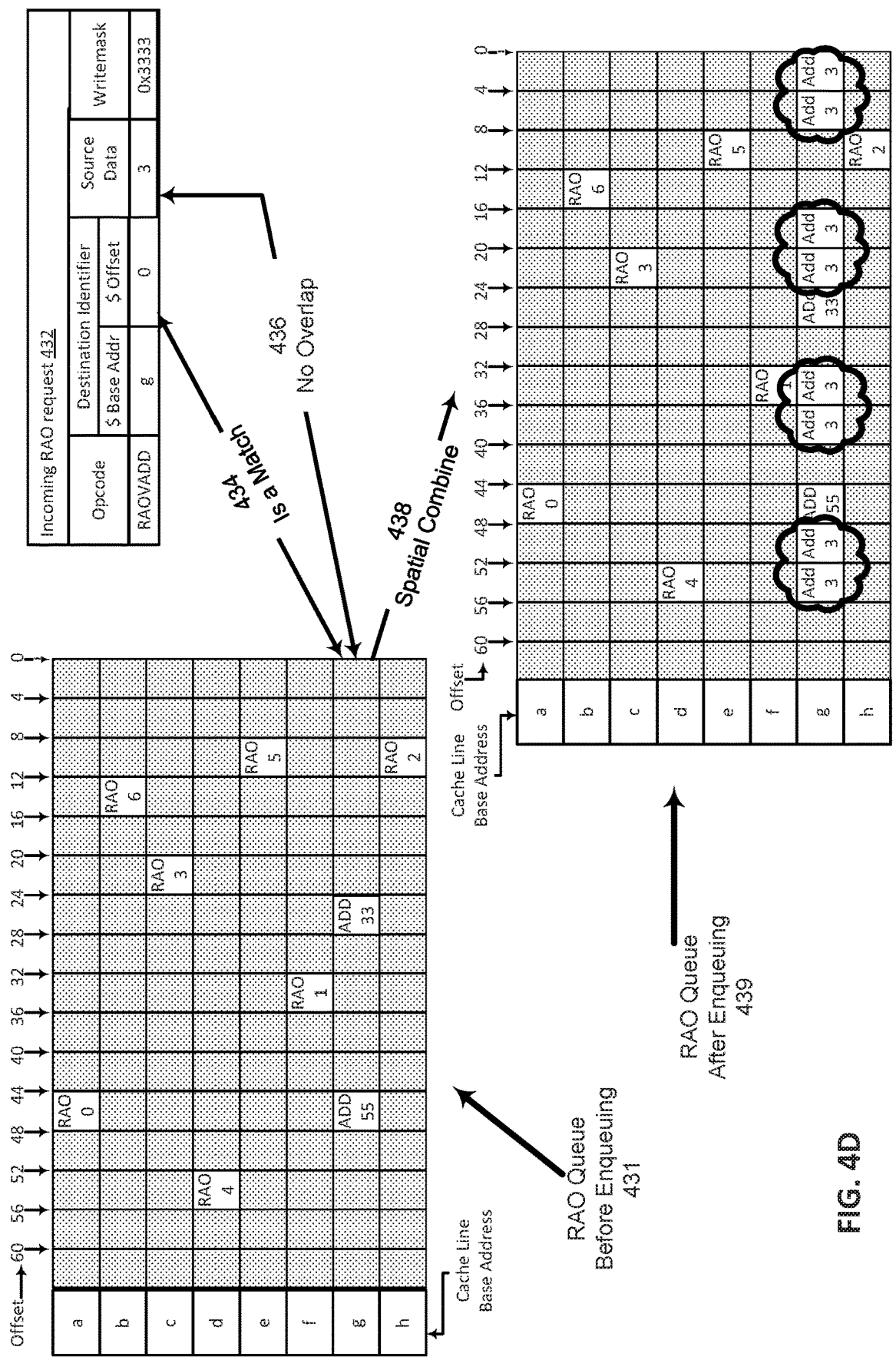
FIG. 4D is a block flow diagram illustrating spatially combining a remote atomic operation instruction with existing, queued entries, according to some embodiments.

FIG. 4D is a block flow diagram illustrating enqueue circuitry spatially combining an incoming RAO instruction with existing, enqueued entries of an RAO instruction queue, according to some embodiments. As shown, RAO instruction queue before enqueueing 431 is a data structure that stores enqueued RAO instructions. Each queue entry includes an RAO instruction addressed to a particular cache line element. In some embodiments, each element includes a memory address, including a cache line base address and a cache line offset. Each entry further includes the specified RAO opcode, and source data, if any.

Each element further includes a timeout counter (or expiration timestamp) that is set to an initial value when the RAO instruction is added to the queue, and allows time to identify an opportunity to combine. The timeout counter can be set statically to a predetermined value by software, or can be set dynamically based on historical combination statistics.

RAO instruction queue 431 is shown as being organized in tabular form, with each row representing a 64-byte cache line and each column representing a 4-byte cache line element, disclosed embodiments can choose various implementations, cache line sizes, and element sizes, without limitation. RAO instruction queue 431 can be stored in registers or in memory, without limitation. In some embodiments, RAO instruction queue 431 is stored in a content-addressable memory to allow for efficient searches for specific cache line addresses.

As shown, incoming RAO instruction 432 specifies a vector-wide broadcast-ADD of a value of '3' to an entire cache line with base address equal to 'g' with writemask equal to 0x3333 (i.e., the value '3' is added to each element on the cache line whose corresponding bit in the writemask is set to '1'). At 434, enqueue circuitry determines whether any RAO instructions to cache line 'g' are already pending in the queue. There are, and at 436, enqueue circuitry determines a degree of overlap between incoming RAO instruction 432 and existing enqueued RAO instructions to cache line 'g'. Finding no overlap between the incoming and matching RAO instructions, enqueue circuitry at 438 spatially combines the incoming and existing RAO instructions to cache line 'g', which is now shown as having a pending 'ADD 55 to offset 44,' a pending 'ADD 33 to offset 24,' and newly added 'ADD 3' to offsets 0, 4, 16, 20, 32, 36, 48, and 52, corresponding to mask bits equal to '1.' Rather than to immediately forward the enqueued RAO instructions to cache line 'g' to cache control circuitry, the enqueue circuit in some embodiments sets a timeout counter for the RAO queue entry at offsets 0, 4, 16, 20, 32, 36, 48, and 52 to a new value to allow some time to await combination opportunities. The updated RAO instruction queue after enqueuing at 439 shows the incoming request having been added to the queue. Operation then continues, awaiting temporal and spatial RAO instruction merging opportunities.

The embodiment of optimization circuitry disclosed in FIG. 4D thus improves the efficiency and reduces the cost of executing RAO instructions by detecting and taking advantage of opportunities to spatially combine multiple RAO instructions. Some embodiments include the optimization circuitry not only in each processing core, where the RAO instructions are generated, but also in a separate execution circuit, such as a cache control circuit, where the atomic operation is actually performed. Even though RAO instructions individually may have high latency (they must go from the core to the cache control circuitry, read the memory location, perform the operation, write back the memory location, and return an acknowledgement to the core), the latency can be substantially hidden by overlapping it with other useful work.

Figure 4E:
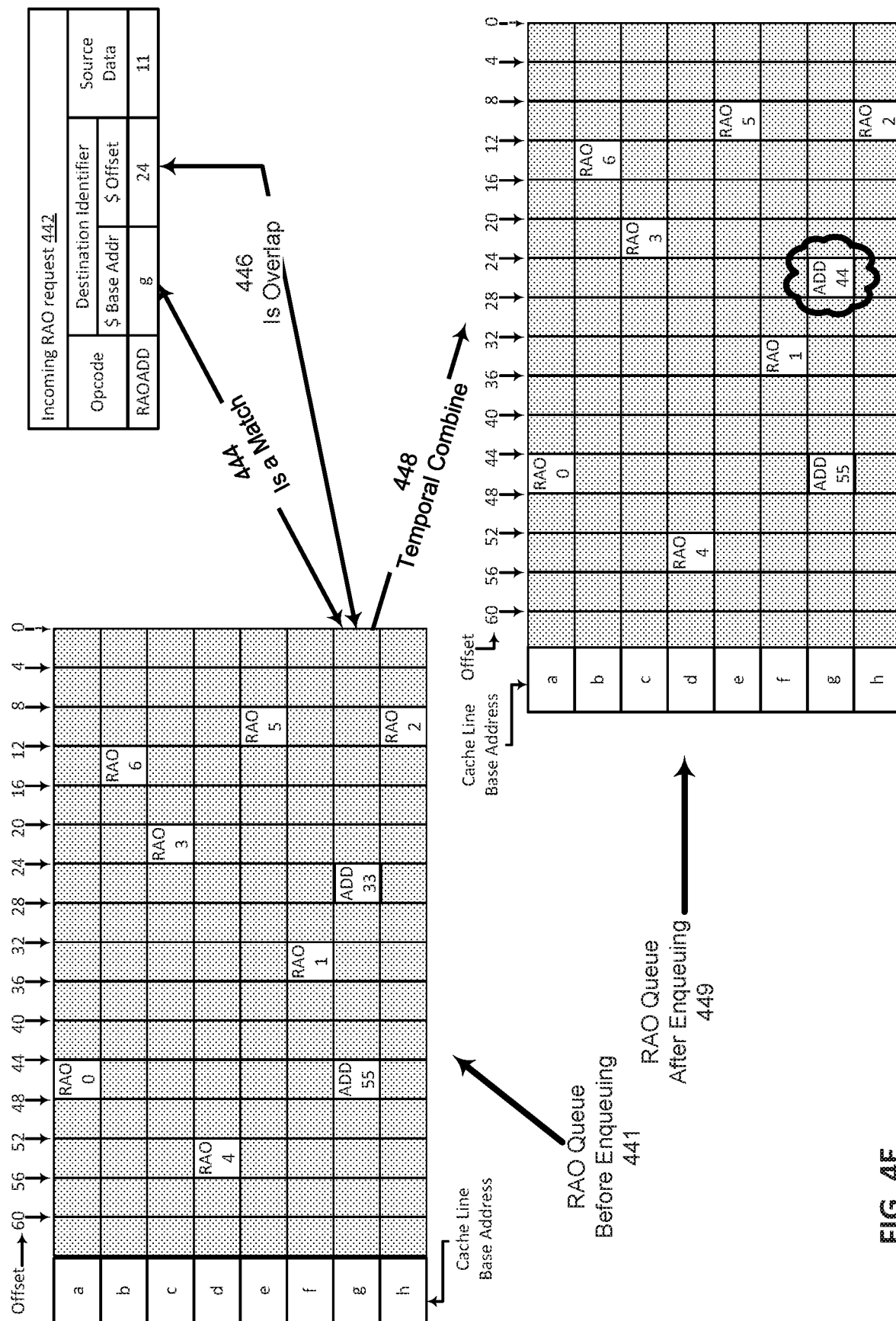
FIG. 4E is a block flow diagram illustrating temporally combining a remote atomic operation instruction with existing, queued entries, according to some embodiments.

FIG. 4E is a block flow diagram illustrating temporally combining an incoming remote atomic operation instruction with existing, queued entries, according to some embodiments. As shown, RAO instruction queue before enqueueing 441 is a data structure that stores enqueued RAO instructions. Each queue entry includes an RAO instruction addressed to a particular cache line element. In some embodiments, each element includes a memory address, including a cache line base address and a cache line offset. Each entry further includes the specified RAO opcode, and source data, if any.

Each element further includes a timeout counter (or expiration timestamp) that is set to an initial value when the RAO instruction is added to the queue, and allows time to identify an opportunity to combine. The timeout counter can be set statically to a predetermined value by software, or can be set dynamically based on historical combination statistics.

RAO instruction queue 441 is shown as being organized in tabular form, with each row representing a 64-byte cache line and each column representing a 4-byte cache line element, disclosed embodiments can choose various implementations, cache line sizes, and element sizes, without limitation. RAO instruction queue 441 can be stored in registers or in memory, without limitation. In some embodiments, RAO instruction queue 441 is stored in a content-addressable memory to allow for efficient searches for specific cache line addresses.

As shown, incoming RAO instruction 442 specifies that a value of '11' be ADDed to offset 24 of the cache line with base address equal to 'g'. At 444, enqueue circuitry determines whether any RAO instructions to cache line 'g' are already pending in the queue. There are, and at 446, enqueue circuitry determines a degree of overlap between incoming RAO instruction 442 and existing enqueued RAO instructions to cache line 'g'. Finding an exact overlap, ADD to offset 24 of cache line 'g', enqueue circuitry at 448 temporally combines the incoming (Add '11') and existing (Add '33') RAO instructions to cache line 'g', which is now shown as having a pending 'ADD 44 to offset 24 of cache line 'g''. Rather than to immediately forward the enqueued RAO instructions to cache line 'g' to cache control circuitry, the enqueue circuit in some embodiments at 448 adds the incoming request to the queue, sets a timeout counter for the RAO queue entry at offset '24,' and resets the timeout counter RAO queue entry at offset '44' to a new value to allow some time to await combination opportunities. The updated RAO instruction queue after enqueuing at 449 shows the incoming request having been added to the queue. Operation then continues, awaiting temporal and spatial RAO instruction merging opportunities.

The embodiment of optimization circuitry disclosed in FIG. 4E thus improves the efficiency and reduces the cost of executing RAO instructions by detecting and taking advantage of opportunities to temporally combine multiple RAO instructions. Some embodiments include the optimization circuitry not only in each processing core, where the RAO instructions are generated, but also in a separate execution circuit, such as a cache control circuit, where the atomic operation is actually performed. Even though RAO instructions individually may have high latency (they must go from the core to the cache control circuitry, read the memory location, perform the operation, write back the memory location, and return an acknowledgement to the core), the latency can be substantially hidden by overlapping it with other useful work.

Figure 4F:
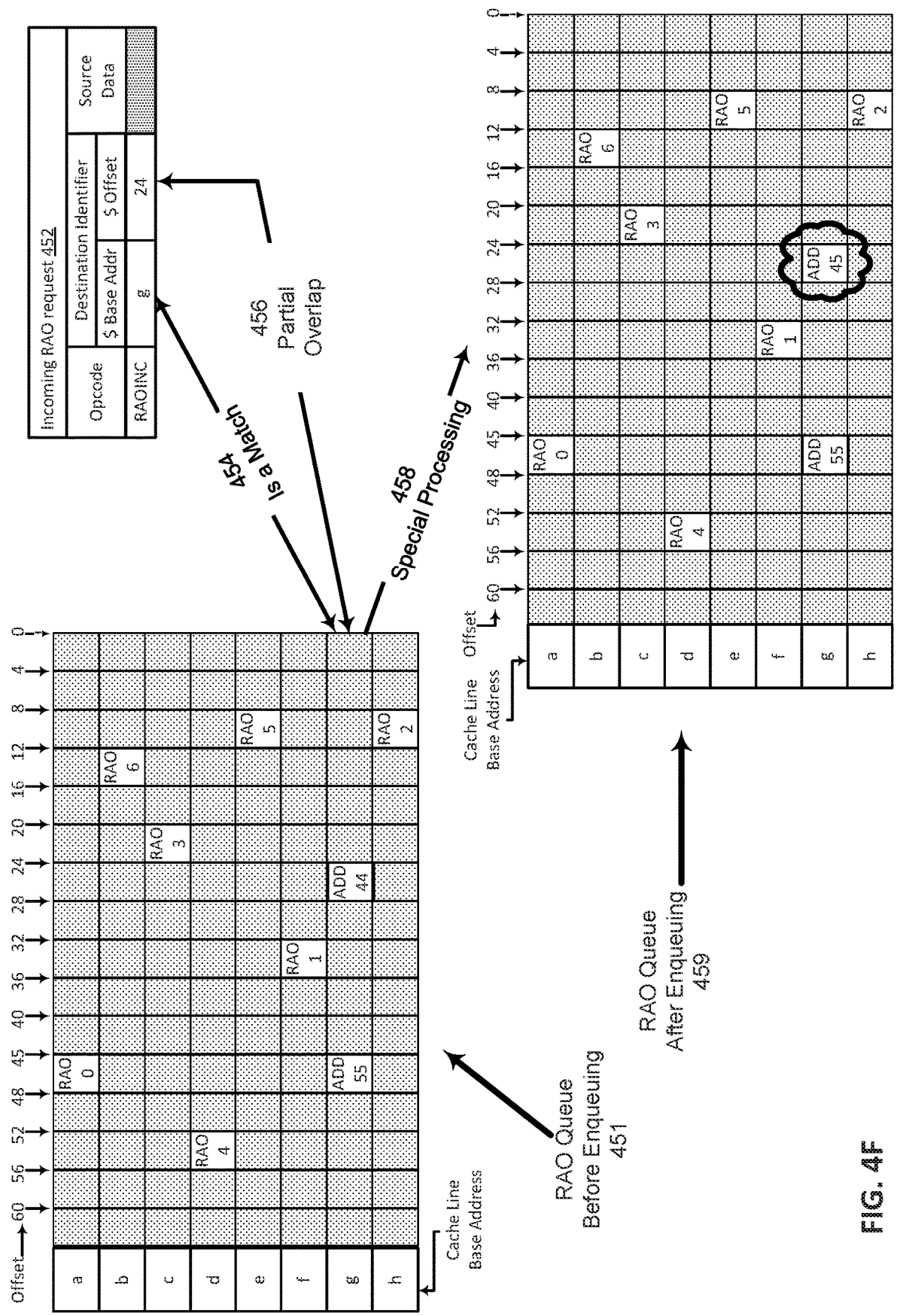
FIG. 4F is a block flow diagram illustrating special processing of a remote atomic operation instruction, according to some embodiments.

FIG. 4F is a block flow diagram illustrating special processing of a remote atomic operation instruction, according to some embodiments. As shown, RAO instruction queue before enqueueing 451 is a data structure that stores enqueued RAO instructions. Each queue entry includes an RAO instruction addressed to a particular cache line element. In some embodiments, each element includes a memory address, including a cache line base address and a cache line offset. Each entry further includes the specified RAO opcode, and source data, if any.

Each element further includes a timeout counter (or expiration timestamp) that is set to an initial value when the RAO instruction is added to the queue, and allows time to identify an opportunity to combine. The timeout counter can be set statically to a predetermined value by software, or can be set dynamically based on historical combination statistics.

RAO instruction queue 451 is shown as being organized in tabular form, with each row representing a 64-byte cache line and each column representing a 4-byte cache line element, disclosed embodiments can choose various implementations, cache line sizes, and element sizes, without limitation. RAO instruction queue 451 can be stored in registers or in memory, without limitation. In some embodiments, RAO instruction queue 451 is stored in a content-addressable memory to allow for efficient searches for specific cache line addresses.

As shown, incoming RAO instruction 452 specifies that the value at offset 24 of the cache line with base address equal to 'g' is to be incremented. At 454, enqueue circuitry determines whether any RAO instructions to cache line 'g' are already pending in the queue. There are, and at 456, enqueue circuitry determines a degree of overlap between incoming RAO instruction 452 and existing enqueued RAO instructions to cache line 'g'. Here, the incoming and existing RAO instructions partially overlap: they specify an update to the same offset of the same cache line, but with different opcodes: ADD vs. INC. In this partial overlap scenario, enqueue circuitry at 458 takes the opportunity to combine the ADD and the INC RAO instructions into a single RAO instruction. In particular, the existing 'ADD 44' RAO instruction to offset 24 of cache line 'g' is combined with the incoming 'INC' RAO instruction to the same cache line element, and a 'ADD 45' is written to offset 24 of cache line 'g'. Rather than to immediately forward the enqueued RAO instructions to cache line 'g' to cache control circuitry, the enqueue circuit in some embodiments at 458 adds the incoming request to the queue, sets a timeout counter for the RAO queue entry at offset '24,' and resets the timeout counter of RAO queue entry at offset '44' to a new value to allow some time to await combination opportunities. The updated RAO instruction queue after enqueuing at 459 shows the incoming request having been added to the queue. Operation then continues, awaiting temporal and spatial RAO instruction merging opportunities.

The embodiment of optimization circuitry disclosed in FIG. 4F thus improves the efficiency and reduces the cost of executing RAO instructions by detecting and taking advantage of opportunities to temporally combine multiple RAO instructions. Some embodiments include the optimization circuitry not only in each processing core, where the RAO instructions are generated, but also in a separate execution circuit, such as a cache control circuit, where the atomic operation is actually performed. Even though RAO instructions individually may have high latency (they must go from the core to the cache control circuitry, read the memory location, perform the operation, write back the memory location, and return an acknowledgement to the core), the latency can be substantially hidden by overlapping it with other useful work.

Figure 4G:
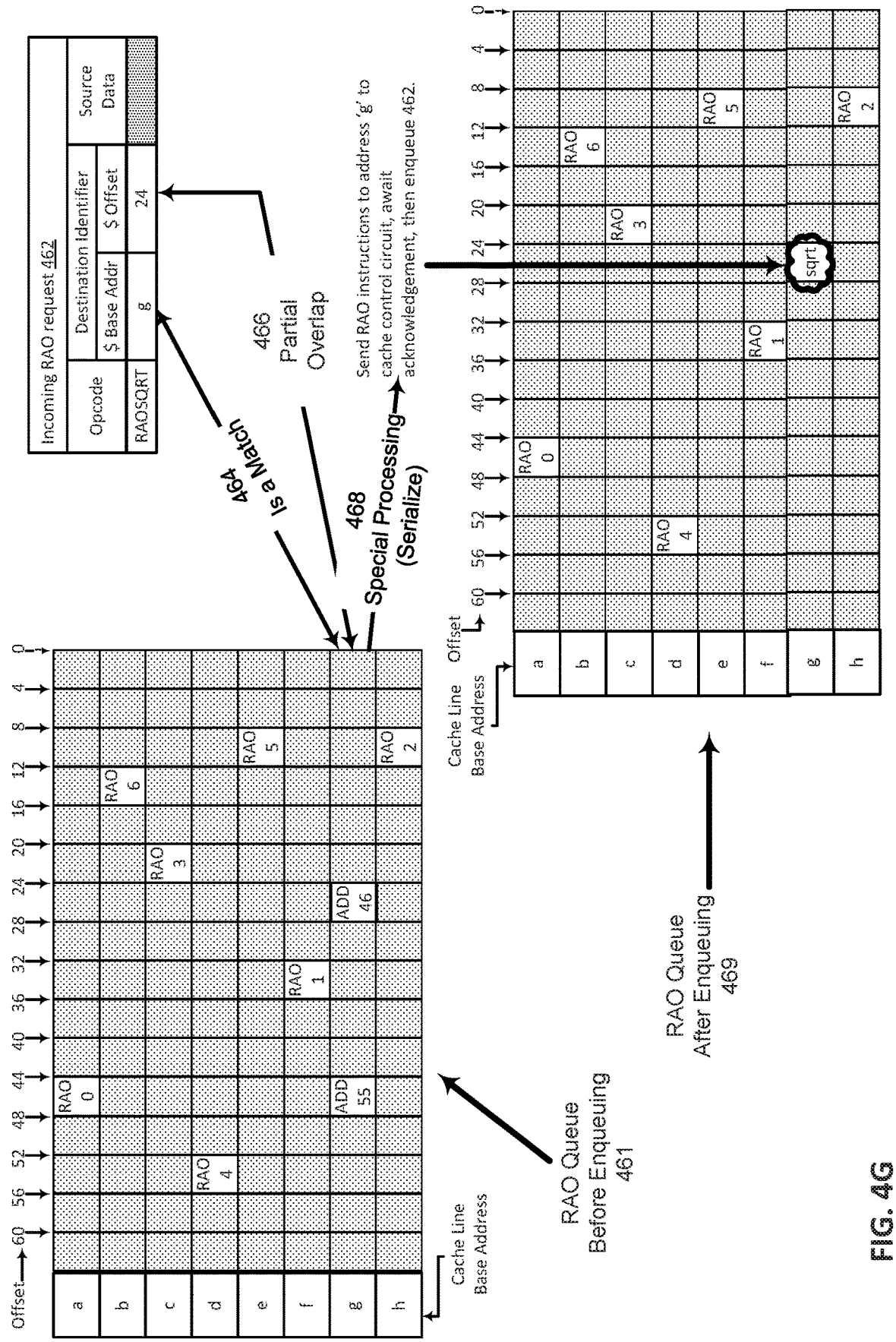
FIG. 4G is a block flow diagram illustrating special processing of a remote atomic operation instruction, according to some embodiments.

FIG. 4G is a block flow diagram illustrating special processing of a remote atomic operation instruction, according to some embodiments. As shown, RAO instruction queue before enqueueing 461 is a data structure that stores enqueued RAO instructions. Each queue entry includes an RAO instruction addressed to a particular cache line element. In some embodiments, each element includes a memory address, including a cache line base address and a cache line offset. Each entry further includes the specified RAO opcode, and source data, if any.

Each element further includes a timeout counter (or expiration timestamp) that is set to an initial value when the RAO instruction is added to the queue, and allows time to identify an opportunity to combine. The timeout counter can be set statically to a predetermined value by software, or can be set dynamically based on historical combination statistics.

RAO instruction queue 461 is shown as being organized in tabular form, with each row representing a 64-byte cache line and each column representing a 4-byte cache line element, disclosed embodiments can choose various implementations, cache line sizes, and element sizes, without limitation. RAO instruction queue 461 can be stored in registers or in memory, without limitation. In some embodiments, RAO instruction queue 461 is stored in a content-addressable memory to allow for efficient searches for specific cache line addresses.

As shown, incoming RAO instruction 462 specifies that the value at offset 24 of the cache line with base address equal to 'g' is to be replaced by a square root of the value. At 464, enqueue circuitry determines whether any RAO instructions to cache line 'g' are already pending in the queue. There are, and at 466, enqueue circuitry determines a degree of overlap between incoming RAO instruction 462 and existing enqueued RAO instructions to cache line 'g'. Here, the incoming and existing RAO instructions partially overlap: they specify an update to the same offset, 24, of the same cache line, 'g', but with different opcodes: ADD vs. SQRT. In this partial overlap scenario, enqueue circuitry at 468 serializes the ADD and the SQRT. In particular, it first stalls instruction 462, since there is nowhere to place it in the queue. Next, regardless of the timeout counter value for the existing enqueued RAO instructions, the enqueue circuit immediately sends all of the RAO instructions to cache line 'g' to the cache control circuit, including the 'ADD 45' to offset 24 and 'ADD 55' to offset 44. In response, the cache control circuit executes the RAO instructions by reading the cache line at address 'g' and performing the additions. When the enqueue circuit receives acknowledgement from the cache control circuit, it clears out the entry for cache line 'g', and inserts instruction 462.

Figure 4H:
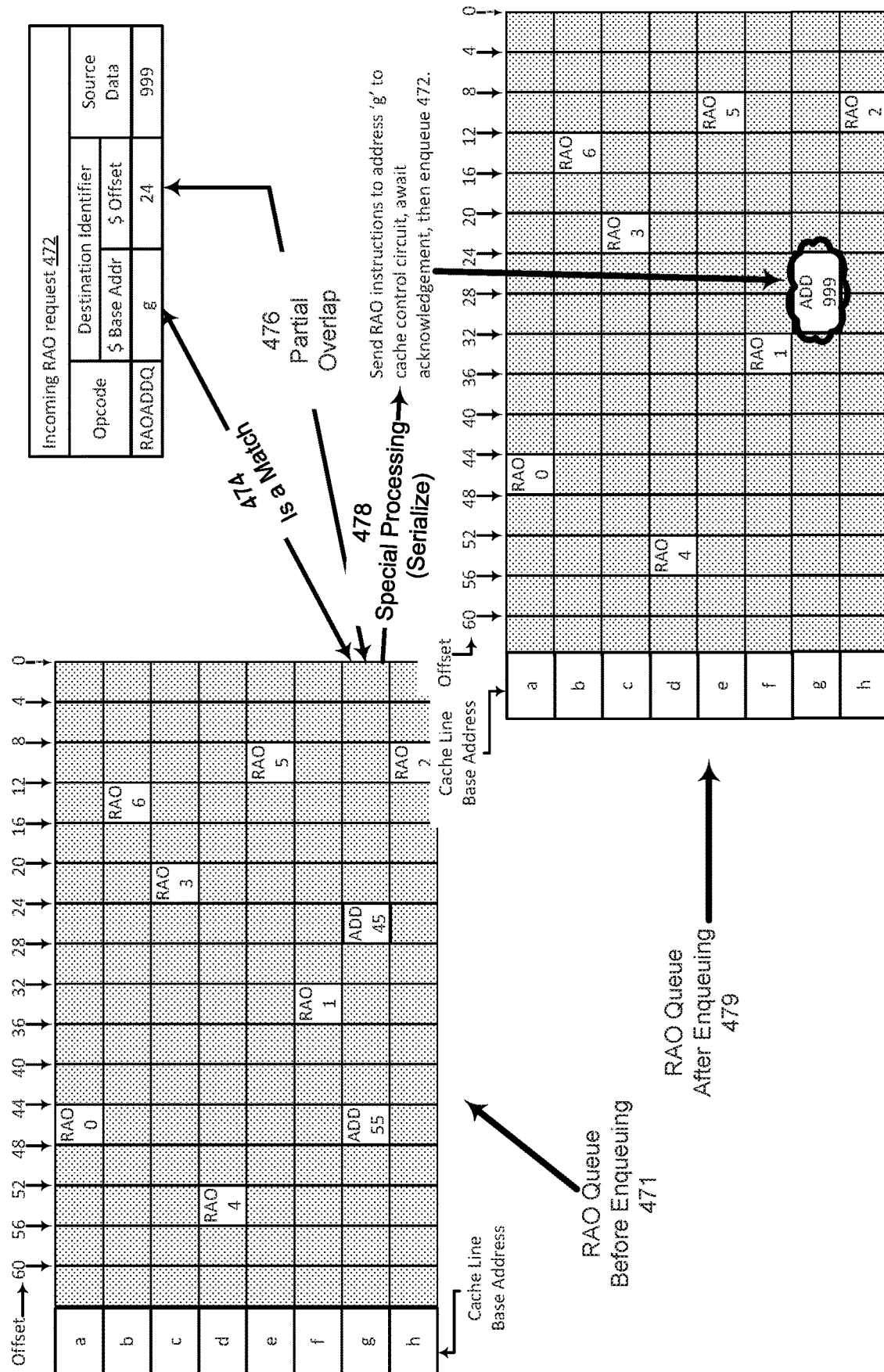
FIG. 4H is a block flow diagram illustrating special processing of a remote atomic operation instruction, according to some embodiments.

FIG. 4H is a block flow diagram illustrating special processing of a remote atomic operation instruction, according to some embodiments. As shown, RAO instruction queue before enqueueing 471 is a data structure that stores enqueued RAO instructions. Each queue entry includes an RAO instruction addressed to a particular cache line element. In some embodiments, each element includes a memory address, including a cache line base address and a cache line offset. Each entry further includes the specified RAO opcode, and source data, if any.

Each element further includes a timeout counter (or expiration timestamp) that is set to an initial value when the RAO instruction is added to the queue, and allows time to identify an opportunity to combine. The timeout counter can be set statically to a predetermined value by software, or can be set dynamically based on historical combination statistics.

RAO instruction queue 471 is shown as being organized in tabular form, with each row representing a 64-byte cache line and each column representing a 4-byte cache line element, disclosed embodiments can choose various implementations, cache line sizes, and element sizes, without limitation. RAO instruction queue 471 can be stored in registers or in memory, without limitation. In some embodiments, RAO instruction queue 471 is stored in a content-addressable memory to allow for efficient searches for specific cache line addresses.

As shown, incoming RAO instruction 472 specifies 'ADD 999' to the quadword value at offset 24 of the cache line with base address equal to 'g'. At 474, enqueue circuitry determines whether any RAO instructions to cache line 'g' are already pending in the queue. There are, and at 476, enqueue circuitry determines a degree of overlap between incoming RAO instruction 472 and existing enqueued RAO instructions to cache line 'g'. Here, the incoming and existing RAO instructions partially overlap: they specify an update to the same offset, 24, of the same cache line 'g', but with different data element sizes: quadword vs. doubleword. In this partial overlap scenario, enqueue circuitry 478 serializes the two ADD instructions. In particular, it first stalls instruction 472, since there is nowhere to place it in the queue. Next, regardless of the timeout counter value for the existing enqueued RAO instructions, the enqueue circuit immediately sends all of the RAO instructions to cache line 'g' to the cache control circuit, including the 'ADD 45' to offset 24 and 'ADD 55' to offset 44. In response, the cache control circuit executes the RAO instructions by reading the cache line at address 'g' and performing the additions. When the enqueue circuit receives acknowledgement from the cache control circuit, it clears out the entry for cache line 'g', and inserts instruction 472.

Figure 4I:
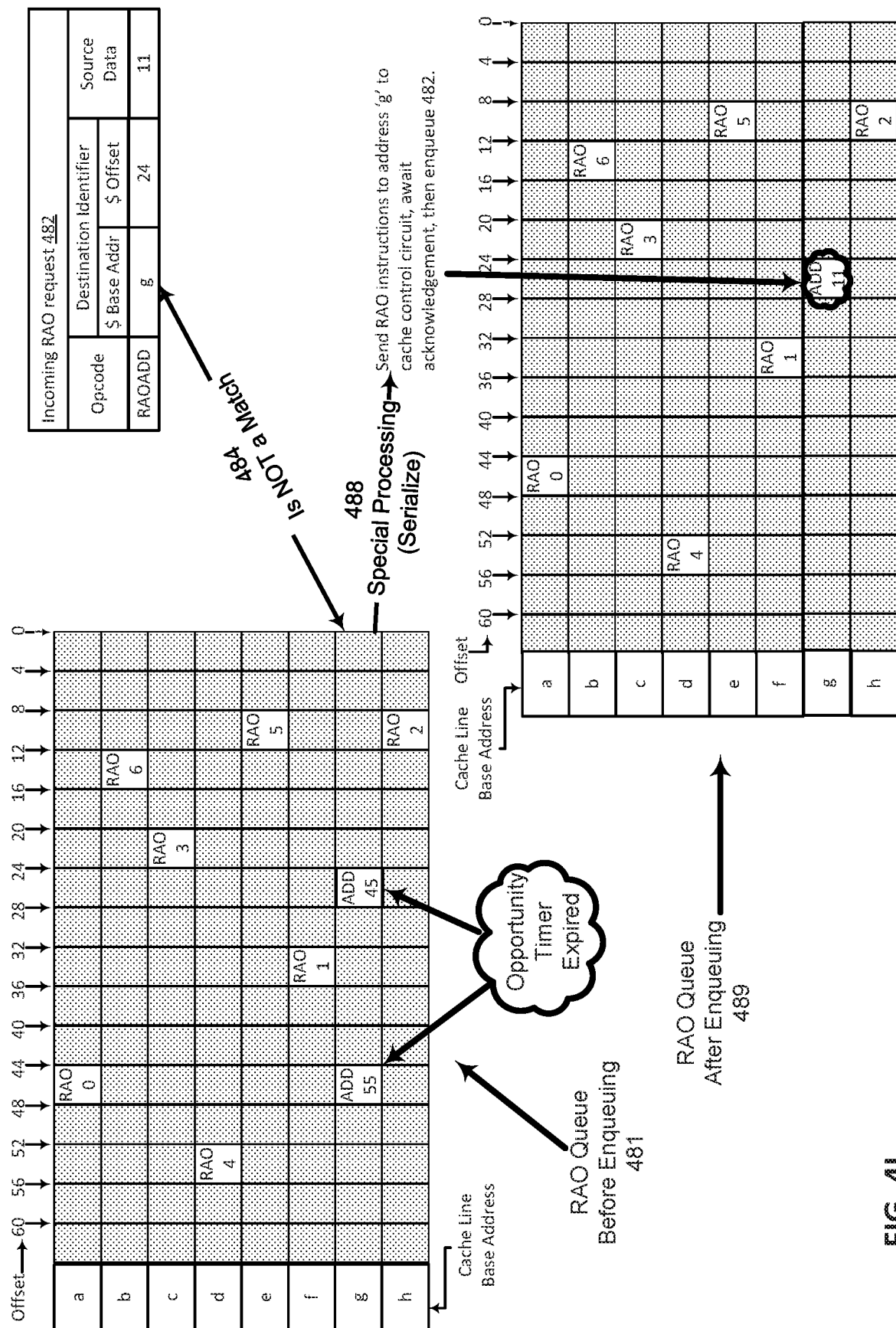
FIG. 4I is a block flow diagram illustrating special processing of a remote atomic operation instruction, according to some embodiments.

FIG. 4I is a block flow diagram illustrating special processing of a remote atomic operation instruction, according to some embodiments. As shown, RAO instruction queue before enqueueing 481 is a data structure that stores enqueued RAO instructions. Each queue entry includes an RAO instruction addressed to a particular cache line element. In some embodiments, each element includes a memory address, including a cache line base address and a cache line offset. Each entry further includes the specified RAO opcode, and source data, if any.

Each element further includes a timeout counter (or expiration timestamp) that is set to an initial value when the RAO instruction is added to the queue, and allows time to identify an opportunity to combine. The timeout counter can be set statically to a predetermined value by software, or can be set dynamically based on historical combination statistics.

RAO instruction queue 481 is shown as being organized in tabular form, with each row representing a 64-byte cache line and each column representing a 4-byte cache line element, disclosed embodiments can choose various implementations, cache line sizes, and element sizes, without limitation. RAO instruction queue 481 can be stored in registers or in memory, without limitation. In some embodiments, RAO instruction queue 481 is stored in a content-addressable memory to allow for efficient searches for specific cache line addresses.

As shown, incoming RAO instruction 482 specifies 'ADD 11' to the value at offset 24 of the cache line with base address equal to 'g'. At 484, enqueue circuitry determines whether any RAO instructions to cache line 'g' are already pending in the queue. Here, however, although a 'ADD 45' RAO instruction is pending in the RAO instruction queue, its timeout counter has expired, indicating the instructions for cache line 'g' have already been sent to the cache control circuit. For purposes of the determination at 484, enqueue circuitry treats the existing 'ADD 45' RAO instruction as invalid, and refrains from spatially or temporally combining the incoming and existing RAO instructions. In this partial overlap scenario, enqueue circuitry at 488 serializes RAO instruction 482 with the previous instructions to cache line 'g'. When the enqueue circuit receives acknowledgement from the cache control circuit for the previous instructions to cache line 'g', it clears out the entry for cache line 'g', and inserts instruction 482.

Figure 4J:
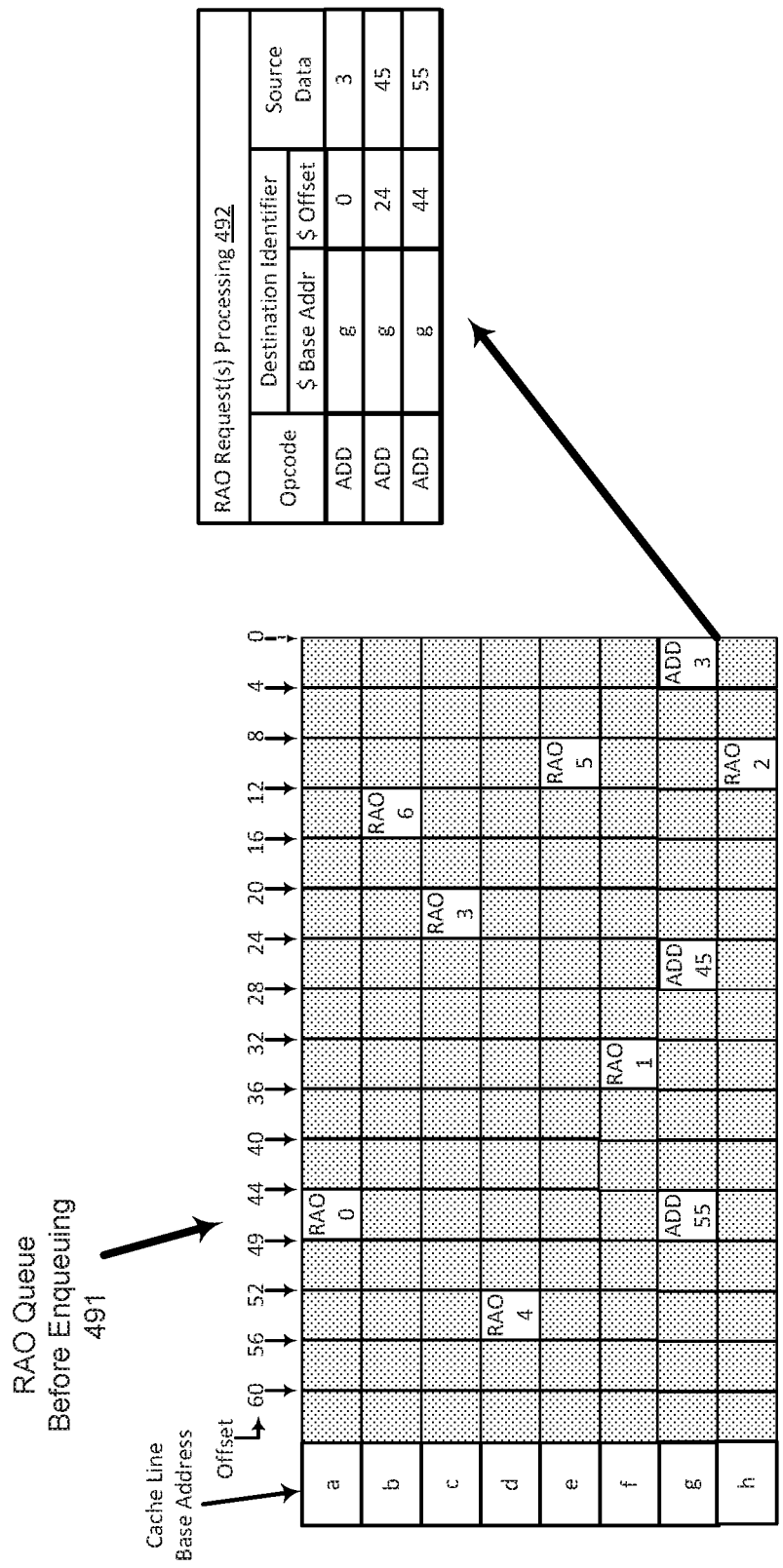
FIG. 4J is a block flow diagram illustrating remote atomic operation instruction forwarded to a central cache control circuit, according to some embodiments.

FIG. 4J is a block flow diagram illustrating remote atomic operation instruction forwarded to a central cache control circuit, according to some embodiments. As shown, RAO instruction queue before enqueueing 491 is a data structure that stores enqueued RAO instructions. Each queue entry includes an RAO instruction addressed to a particular cache line element. In some embodiments, each element includes a memory address, including a cache line base address and a cache line offset. Each entry further includes the specified RAO opcode, and source data, if any.

With respect to the enqueued RAO instructions to cache line, 'g', enqueue circuit at some point, for example upon expiration of one or more of the timeout counters of the RAO instructions enqueued for that cache line, sends RAO instructions to a cache control circuit, where they will be performed. In some embodiments, enqueue circuitry sends a subset of RAO instructions in one message to the cache control circuit, as shown at 492. In some embodiments, this subset will always be the complete set of enqueued instructions for the cache line. In some embodiments, the enqueue circuitry sends a subset of instructions to the cache control circuit in multiple messages, with all but the last message including a 'MORE ON THE WAY' signal.

Figure 5:
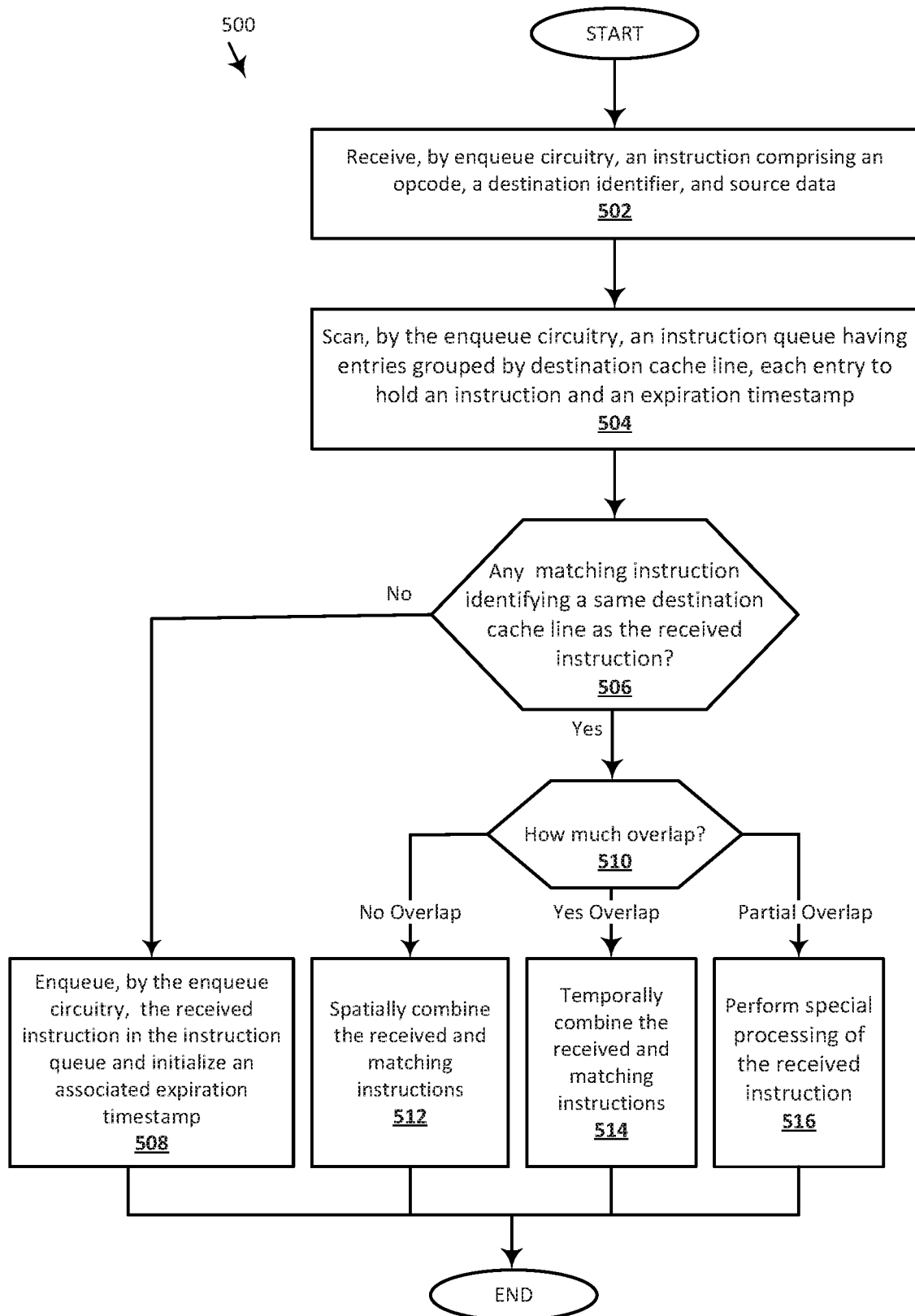
FIG. 5 is a block diagram illustrating processing a received remote atomic operation instruction, according to some embodiments.

FIG. 5 is a block diagram illustrating processing a received remote atomic operation instruction, according to some embodiments. After starting, at 502, enqueue circuitry receives an instruction comprising an opcode, a destination identifier, and source data. At 504, the enqueue circuitry scans an RAO instruction queue having entries grouped by destination cache line, each entry to hold an instruction and an expiration timestamp. At 506, enqueue circuitry detects any matching RAO instructions identifying a same destination cache line as the received RAO instruction. At 508, enqueue circuitry, when there is no matching existing RAO instruction, enqueues the received RAO instruction in the instruction queue and initializes an associated expiration timestamp. At 510, enqueue circuitry, when a matching enqueued RAO instruction exists, determines a degree of overlap between the received and the existing, enqueued RAO instructions. In some embodiments, to make the overlap determination, enqueue circuitry compares the opcodes, element sizes, cache line addresses, and cache line offsets of the received and existing RAO instructions. At 512, the enqueue circuit, when there is no overlap, spatially combines the received and matching instructions, for example as illustrated and described with respect to FIGS. 4B-4C. At 514, the enqueue circuit, when there is an exact overlap, temporally combines the received and matching instructions, for example as illustrated and described with respect to FIG. 4D. At 516, enqueue circuitry, when there is a partial overlap, performs special processing, for example as illustrated and described with respect to FIGS. 4E-4H.

Exemplary execution circuits for executing remote atomic operation instructions are further discussed and illustrated with respect to FIG. 10A to FIG. 12, below.

Where RAO Instructions are Executed

Remote atomic operations, as defined as instructions in various embodiments herein, are defined such that they may be performed in a variety of locations in the processor, such as: at one or more of the cores of a multiprocessor, at a private cache, at a shared cache or caching and home agent (CHA), at the memory controller, or at a remote core. RAO instructions are for both single-socket and multi-socket systems.

RAO Instruction Types

In some embodiments, executing the instruction is to involve a read-modify-write, whereby the processor reads the contents of a memory location, modifies the data that was read, and writes the result back to the memory location. Optional parameters can serve to modify the operation that is performed during the modify stage.

There are two different classes of RAO instructions: those whose only output is the memory location that is atomically updated, and those that also have a destination register. There are microarchitectural implications of this difference.

RAO instructions whose only output is the memory location that is atomically updated can be weakly ordered; due to the weak ordering, such an RAO instruction is retired as soon as the operation is issued to the memory system, without waiting for the operation to complete. Instructions with a register destination, on the other hand, can similarly complete as soon as the operation is issued to the memory system, but the core must still track that the instruction will be producing a value for its destination register, to enforce data dependences on any consumers. For this reason, in some embodiments, instructions with a register destination are treated as strongly ordered.

All RAO instructions take a memory destination and a general purpose register operand. Some additionally take an extra, implicit operand (e.g., in RAX).

Embodiments disclosed herein cover the following specific operations, and are extensible to others.

No Register Destination (I.E., OP Memdest, Reg)
    RAO_ADD—integer addition
    RAO_SUB—integer subtraction
    RAO_ADD_SAT—integer saturating addition
    RAO_SUB_FLR—integer subtract w/floor
    RAO_AND—logical AND
    RAO_OR—logical OR
    RAO_XOR—logical XOR RAO Instructions with Register Destination (I.E., OP Memdest, Regdest, Reg)

RAO_ADD_THR—integer addition with threshold (reg destination is a single bit flag)

RAO_SUB_THR—integer subtraction with threshold (reg destination is a single bit flag)

RAO_XADD—integer exchange and add

RAO_XINC—integer exchange and increment

RAO_XDEC—integer exchange and decrement

RAO_XCHG—exchange

RAO_CMPXCHG—compare and exchange

RAO Instruction Formats

Figure 6:
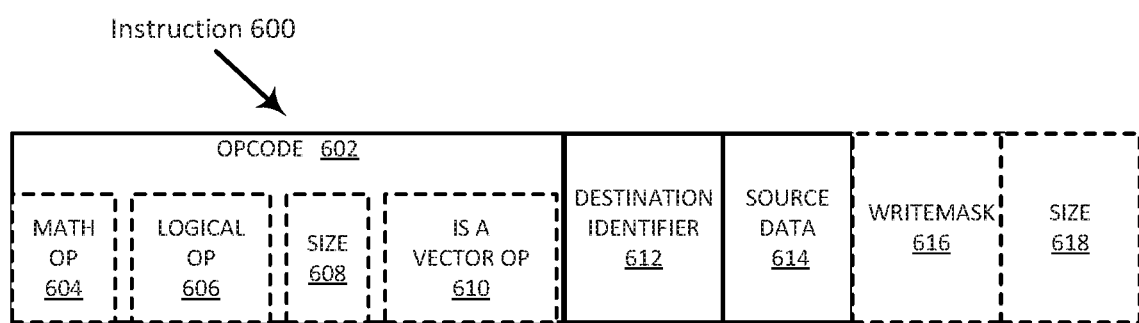
FIG. 6 is a block diagram illustrating a format for instructions for remote atomic operations, according to some embodiments.

FIG. 6 is a block diagram illustrating a format for instructions for remote atomic operations, according to some embodiments. As shown, RAO instruction 600 includes opcode 602, optional size identifier 608 and 618 (optional instruction fields are shown in boxes with dashed outline), destination identifier 612, and source data 614.

Optional size identifier 608 and 618, in some embodiments, is included in the opcode, such as a prefix or suffix, "B," "W," "D," and "Q," corresponding to a size-1 byte, 2 bytes, 4 bytes, or 8 bytes, respectively—of each source vector element. In some embodiments, optional size identifier 608 is included in the opcode, such as a prefix or suffix, "H," "S," "D," "Q" and "E," corresponding to precision levels—Half precision (2 bytes), Single precision (4 bytes), Double precision (8 bytes), and Quadruple precision (16 bytes), respectively—of each source vector element. In other embodiments, optional size identifier 6018 is an instruction parameter or operand specifying the source vector element's size and/or precision level.

Figure 9:
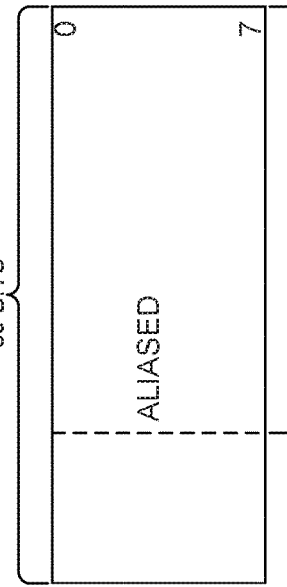
FIG. 9 is a block diagram of a register architecture according to one embodiment of the invention.
Figure 9:
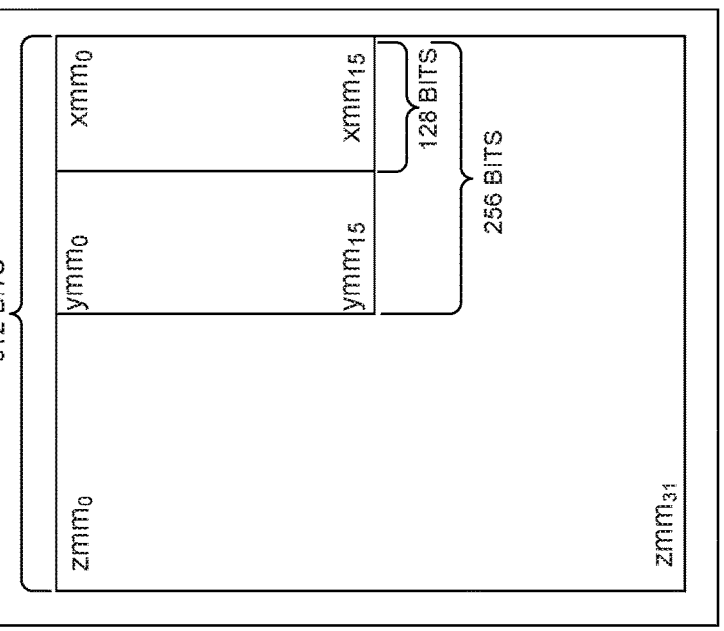

Source data 614, in some embodiments, is to specify a source register, such as one of the registers included in a processor's register file. FIG. 9 and its associated description further below describe an embodiment of a processor's register file. In some embodiments, source data 614 is to identify a memory location. In some embodiments, source data 614 is to identify an immediate.

Destination identifier 612 identifies either vector registers of the processor's register file or memory locations to which to write execution results according to some embodiments described below, for example, with reference to FIG. 5.

Exemplary instruction formats for remote atomic operation instructions are further discussed and illustrated with respect to FIG. 7A to FIG. 8D, below.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 7A:
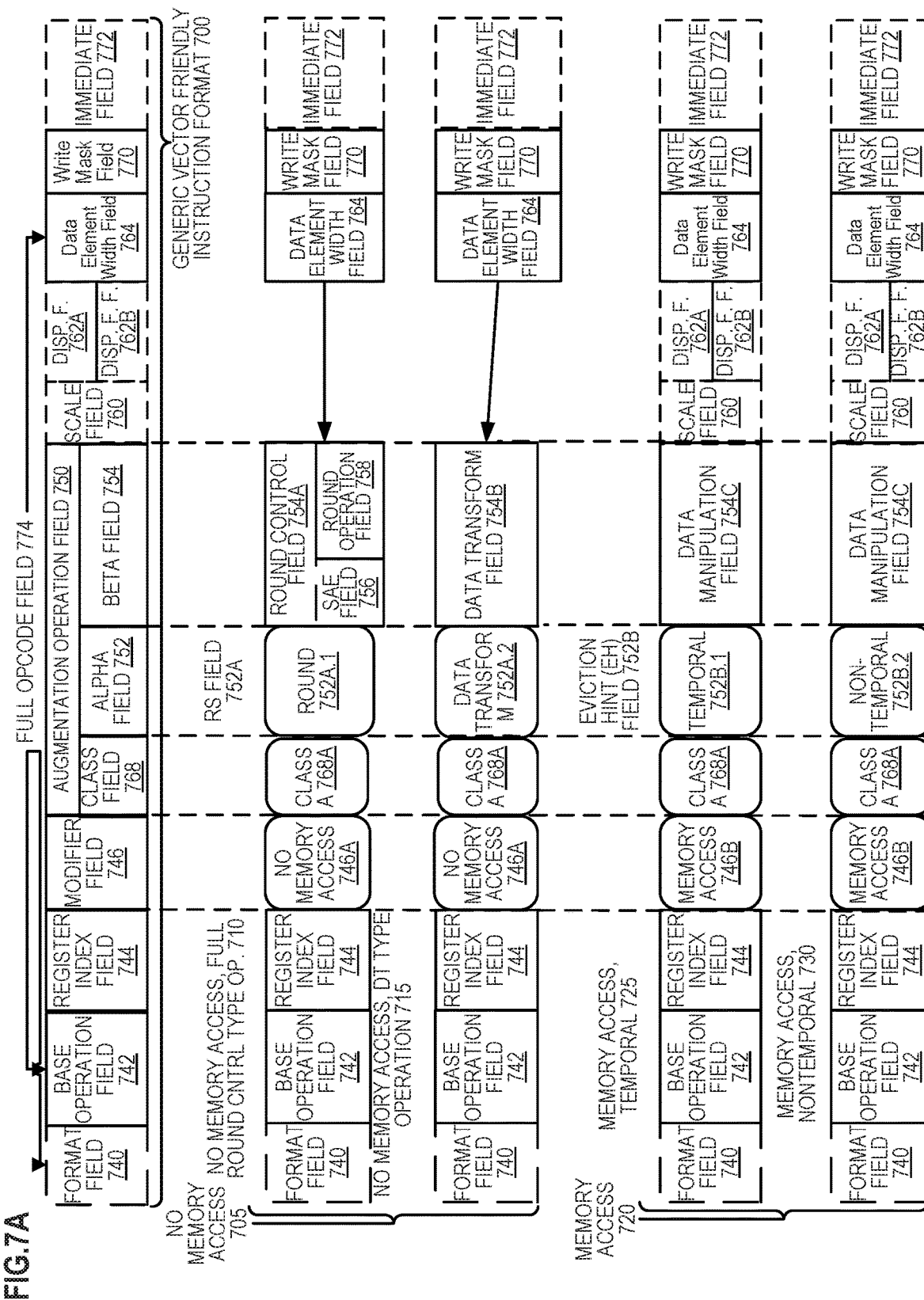
FIGS. 7A-7B are block diagrams illustrating a generic vector friendly instruction format and instruction templates thereof according to embodiments of the invention.
Figure 7B:
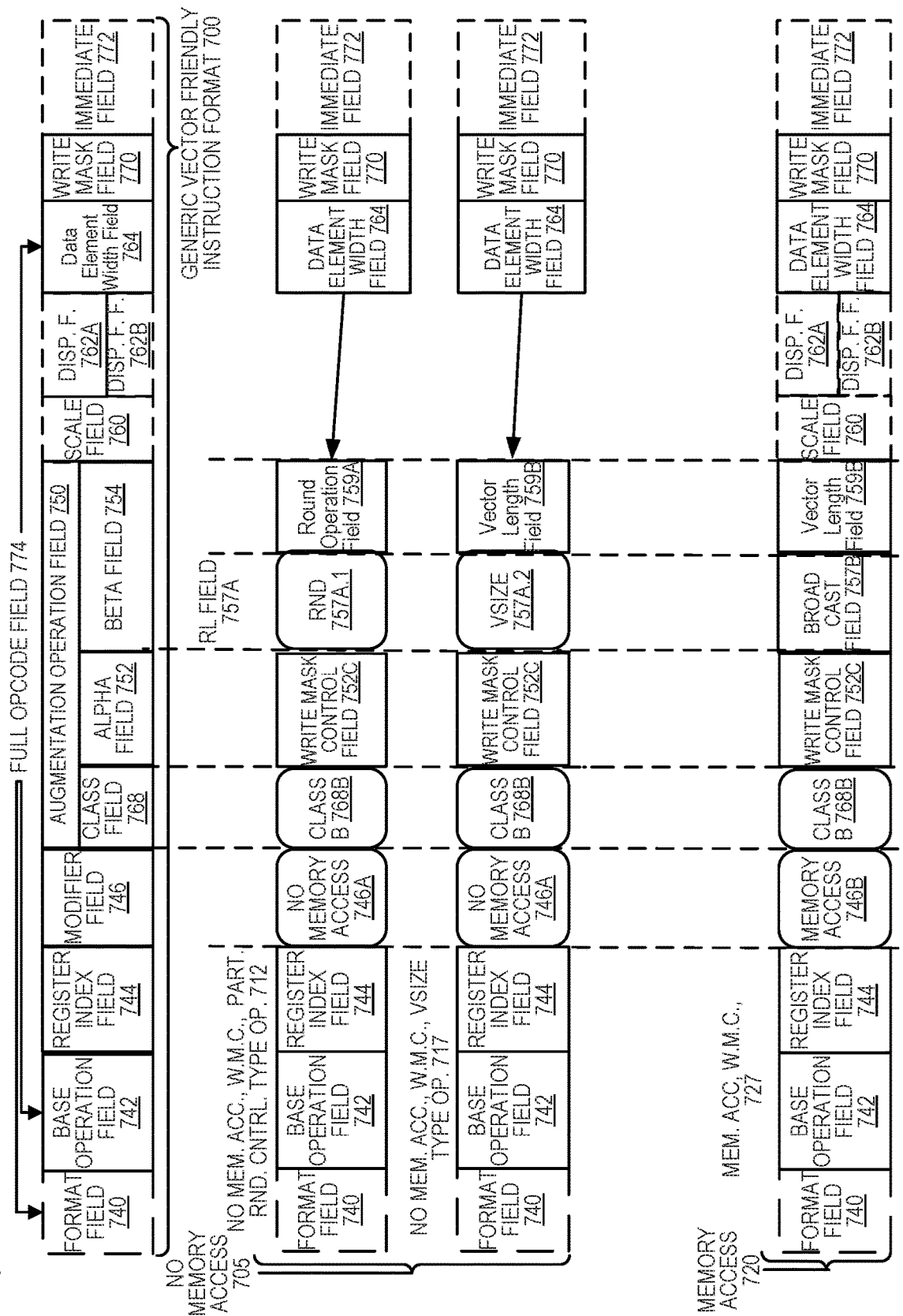

FIGS. 7A-7B are block diagrams illustrating a generic vector friendly instruction format and instruction templates thereof according to embodiments of the invention. FIG. 7A is a block diagram illustrating a generic vector friendly instruction format and class A instruction templates thereof according to embodiments of the invention; while FIG. 7B is a block diagram illustrating the generic vector friendly instruction format and class B instruction templates thereof according to embodiments of the invention. Specifically, a generic vector friendly instruction format 700 for which are defined class A and class B instruction templates, both of which include no memory access 705 instruction templates and memory access 720 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 7A include: 1) within the no memory access 705 instruction templates there is shown a no memory access, full round control type operation 710 instruction template and a no memory access, data transform type operation 715 instruction template; and 2) within the memory access 720 instruction templates there is shown a memory access, temporal 725 instruction template and a memory access, non-temporal 730 instruction template. The class B instruction templates in FIG. 7B include: 1) within the no memory access 705 instruction templates there is shown a no memory access, write mask control, partial round control type operation 712 instruction template and a no memory access, write mask control, vsize type operation 717 instruction template; and 2) within the memory access 720 instruction templates there is shown a memory access, write mask control 727 instruction template.

The generic vector friendly instruction format 700 includes the following fields listed below in the order illustrated in FIGS. 7A-7B.

Format field 740—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 742—its content distinguishes different base operations.

Register index field 744—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 746—its content distinguishes occurrences of instructions in the generic vector instruction format that specify memory access from those that do not; that is, between no memory access 705 instruction templates and memory access 720 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 750—its content distinguishes which one of a variety of different operations to be performed in addition to the base operation. This field is context specific. In one embodiment of the invention, this field is divided into a class field 768, an alpha field 752, and a beta field 754. The augmentation operation field 750 allows common groups of operations to be performed in a single instruction rather than 2, 3, or 4 instructions.

Scale field 760—its content allows for the scaling of the index field's content for memory address generation (e.g., for address generation that uses $2^{scale}$*index+base).

Displacement Field 762A—its content is used as part of memory address generation (e.g., for address generation that uses $2^{scale}$*index+base+displacement).

Displacement Factor Field 762B (note that the juxtaposition of displacement field 762A directly over displacement factor field 762B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 774 (described later herein) and the data manipulation field 754C. The displacement field 762A and the displacement factor field 762B are optional in the sense that they are not used for the no memory access 705 instruction templates and/or different embodiments may implement only one or none of the two.

Data element width field 764—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 770—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 770 allows for partial vector operations, including loads, stores, arithmetic, logical, etc. While embodiments of the invention are described in which the write mask field's 770 content selects one of a number of write mask registers that contains the write mask to be used (and thus the write mask field's 770 content indirectly identifies that masking to be performed), alternative embodiments instead or additional allow the mask write field's 770 content to directly specify the masking to be performed.

Immediate field 772—its content allows for the specification of an immediate. This field is optional in the sense that is it not present in an implementation of the generic vector friendly format that does not support immediate and it is not present in instructions that do not use an immediate.

Class field 768—its content distinguishes between different classes of instructions. With reference to FIGS. 7A-B, the contents of this field select between class A and class B instructions. In FIGS. 7A-B, rounded corner squares are used to indicate a specific value is present in a field (e.g., class A 768A and class B 768B for the class field 768 respectively in FIGS. 7A-B).

Instruction Templates of Class A

In the case of the non-memory access 705 instruction templates of class A, the alpha field 752 is interpreted as an RS field 752A, whose content distinguishes which one of the different augmentation operation types are to be performed (e.g., round 752A.1 and data transform 752A.2 are respectively specified for the no memory access, round type operation 710 and the no memory access, data transform type operation 715 instruction templates), while the beta field 754 distinguishes which of the operations of the specified type is to be performed. In the no memory access 705 instruction templates, the scale field 760, the displacement field 762A, and the displacement factor field 762B are not present.

No-Memory Access Instruction Templates—Full Round Control Type Operation

In the no memory access, full round control type operation 710 instruction template, the beta field 754 is interpreted as a round control field 754A, whose content(s) provide static rounding. While in the described embodiments of the invention the round control field 754A includes a suppress all floating point exceptions (SAE) field 756 and a round operation control field 758, alternative embodiments may support may encode both these concepts into the same field or only have one or the other of these concepts/fields (e.g., may have only the round operation control field 758).

SAE field 756—its content distinguishes whether or not to disable the exception event reporting; when the SAE field's 756 content indicates, suppression is enabled, a given instruction does not report any kind of floating-point exception flag and does not raise any floating point exception handler.

Round operation control field 758—its content distinguishes which one of a group of rounding operations to perform (e.g., Round-up, Round-down, Round-towards-zero and Round-to-nearest). Thus, the round operation control field 758 allows for the changing of the rounding mode on a per instruction basis. In one embodiment of the invention where a processor includes a control register for specifying rounding modes, the round operation control field's 750 content overrides that register value.

No Memory Access Instruction Templates—Data Transform Type Operation

In the no memory access data transform type operation 715 instruction template, the beta field 754 is interpreted as a data transform field 754B, whose content distinguishes which one of a number of data transforms is to be performed (e.g., no data transform, swizzle, broadcast).

In the case of a memory access 720 instruction template of class A, the alpha field 752 is interpreted as an eviction hint field 752B, whose content distinguishes which one of the eviction hints is to be used (in FIG. 7A, temporal 752B.1 and non-temporal 752B.2 are respectively specified for the memory access, temporal 725 instruction template and the memory access, non-temporal 730 instruction template), while the beta field 754 is interpreted as a data manipulation field 754C, whose content distinguishes which one of a number of data manipulation operations (also known as primitives) is to be performed (e.g., no manipulation; broadcast; up conversion of a source; and down conversion of a destination). The memory access 720 instruction templates include the scale field 760, and optionally the displacement field 762A or the displacement scale field 762B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 752 is interpreted as a write mask control (Z) field 752C, whose content distinguishes whether the write masking controlled by the write mask field 770 should be a merging or a zeroing.

In the case of the non-memory access 705 instruction templates of class B, part of the beta field 754 is interpreted as an RL field 757A, whose content distinguishes which one of the different augmentation operation types are to be performed (e.g., round 757A.1 and vector length (VSIZE) 757A.2 are respectively specified for the no memory access, write mask control, partial round control type operation 712 instruction template and the no memory access, write mask control, VSIZE type operation 717 instruction template), while the rest of the beta field 754 distinguishes which of the operations of the specified type is to be performed. In the no memory access 705 instruction templates, the scale field 760, the displacement field 762A, and the displacement factor field 762B are not present.

In the no memory access, write mask control, partial round control type operation 710 instruction template, the rest of the beta field 754 is interpreted as a round operation field 759A and exception event reporting is disabled (a given instruction does not report any kind of floating-point exception flag and does not raise any floating point exception handler).

Round operation control field 759A—just as round operation control field 758, its content distinguishes which one of a group of rounding operations to perform (e.g., Round-up, Round-down, Round-towards-zero and Round-to-nearest). Thus, the round operation control field 759A allows for the changing of the rounding mode on a per instruction basis. In one embodiment of the invention where a processor includes a control register for specifying rounding modes, the round operation control field's 750 content overrides that register value.

In the no memory access, write mask control, VSIZE type operation 717 instruction template, the rest of the beta field 754 is interpreted as a vector length field 759B, whose content distinguishes which one of a number of data vector lengths is to be performed on (e.g., 128, 256, or 512 byte).

In the case of a memory access 720 instruction template of class B, part of the beta field 754 is interpreted as a broadcast field 757B, whose content distinguishes whether or not the broadcast type data manipulation operation is to be performed, while the rest of the beta field 754 is interpreted the vector length field 759B. The memory access 720 instruction templates include the scale field 760, and optionally the displacement field 762A or the displacement factor field 762B.

With regard to the generic vector friendly instruction format 700, a full opcode field 774 is shown including the format field 740, the base operation field 742, and the data element width field 764. While one embodiment is shown where the full opcode field 774 includes all of these fields, the full opcode field 774 includes less than all of these fields in embodiments that do not support all of them. The full opcode field 774 provides the operation code (opcode).

The augmentation operation field 750, the data element width field 764, and the write mask field 770 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 8A is a block diagram illustrating an exemplary specific vector friendly instruction format according to embodiments of the invention. FIG. 8A shows a specific vector friendly instruction format 800 that is specific in the sense that it specifies the location, size, interpretation, and order of the fields, as well as values for some of those fields. The specific vector friendly instruction format 800 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 7A or 7B into which the fields from FIG. 8A map are illustrated.

It should be understood that, although embodiments of the invention are described with reference to the specific vector friendly instruction format 800 in the context of the generic vector friendly instruction format 700 for illustrative purposes, the invention is not limited to the specific vector friendly instruction format 800 except where claimed. For example, the generic vector friendly instruction format 700 contemplates a variety of possible sizes for the various fields, while the specific vector friendly instruction format 800 is shown as having fields of specific sizes. By way of specific example, while the data element width field 764 is illustrated as a one bit field in the specific vector friendly instruction format 800, the invention is not so limited (that is, the generic vector friendly instruction format 700 contemplates other sizes of the data element width field 764).

The specific vector friendly instruction format 800 includes the following fields listed below in the order illustrated in FIG. 8A.

EVEX Prefix (Bytes 0-3) 802—is encoded in a four-byte form.

Format Field 740 (EVEX Byte 0, bits [7:0])—the first byte (EVEX Byte 0) is the format field 740 and it contains 0x62 (the unique value used for distinguishing the vector friendly instruction format in one embodiment of the invention).

The second-fourth bytes (EVEX Bytes 1-3) include a number of bit fields providing specific capability.

REX field 805 (EVEX Byte 1, bits [7-5])—consists of a EVEX.R bit field (EVEX Byte 1, bit [7]—R), EVEX.X bit field (EVEX byte 1, bit [6]—X), and EVEX.B bit field (EVEX byte 1, bit [5]—B). The EVEX.R, EVEX.X, and EVEX.B bit fields provide the same functionality as the corresponding VEX bit fields, and are encoded using 1 s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 710—this is the first part of the REX' field 710 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 815 (EVEX byte 1, bits [3:0]—mmmm)—its content encodes an implied leading opcode byte (0F, 0F 38, or 0F 3).

Data element width field 764 (EVEX byte 2, bit [7]—W)—is represented by the notation EVEX.W. EVEX.W is used to define the granularity (size) of the datatype (either 32-bit data elements or 64-bit data elements).

EVEX.vvvv 820 (EVEX Byte 2, bits [6:3]—vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1 s complement form for certain vector shifts; or 3) EVEX.vvvv does not encode any operand, the field is reserved and should contain 1111b. Thus, EVEX.vvvv field 820 encodes the 4 low-order bits of the first source register specifier stored in inverted (1 s complement) form. Depending on the instruction, an extra different EVEX bit field is used to extend the specifier size to 32 registers.

EVEX.U 768 Class field (EVEX byte 2, bit [2]-U)—If EVEX.U=0, it indicates class A or EVEX.U0; if EVEX.U=1, it indicates class B or EVEX.U1.

Prefix encoding field 825 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 752 (EVEX byte 3, bit [7]—EH; also, known as EVEX.EH, EVEX.rs, EVEX.RL, EVEX.write mask control, and EVEX.N; also, illustrated with α)—as previously described, this field is context specific.

Beta field 754 (EVEX byte 3, bits [6:4]-SSS, also known as EVEX.s$_{2-0}$, EVEX.r$_{2-0}$, EVEX.rr1, EVEX.LL0, EVEX.LLB; also, illustrated with βββ)—as previously described, this field is context specific.

REX' field 710—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 770 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 830 (Byte 4) is also known as the opcode byte. Part of the opcode is specified in this field.

MOD R/M Field 840 (Byte 5) includes MOD field 842, Reg field 844, and R/M field 846. As previously described, the MOD field's 842 content distinguishes between memory access and non-memory access operations. The role of Reg field 844 can be summarized to two situations: encoding either the destination register operand or a source register operand, or be treated as an opcode extension and not used to encode any instruction operand. The role of R/M field 846 may include the following: encoding the instruction operand that references a memory address, or encoding either the destination register operand or a source register operand.

Scale, Index, Base (SIB) Byte (Byte 6)—As previously described, the scale field's 750 content is used for memory address generation. SIB.xxx 854 and SIB.bbb 856—the contents of these fields have been previously referred to with regard to the register indexes Xxxx and Bbbb.

Displacement field 762A (Bytes 7-10)—when MOD field 842 contains 10, bytes 7-10 are the displacement field 762A, and it works the same as the legacy 32-bit displacement (disp32) and works at byte granularity.

Displacement factor field 762B (Byte 7)—when MOD field 842 contains 01, byte 7 is the displacement factor field 762B. The location of this field is that same as that of the legacy x86 instruction set 8-bit displacement (disp8), which works at byte granularity. Since disp8 is sign extended, it can only address between −128 and 127 bytes' offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 762B is a reinterpretation of disp8; when using displacement factor field 762B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement assumes that the effective displacement is multiple of the granularity of the memory access, and hence, the redundant low-order bits of the address offset do not need to be encoded. In other words, the displacement factor field 762B substitutes the legacy x86 instruction set 8-bit displacement. Thus, the displacement factor field 762B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 772 operates as previously described.

Full Opcode Field

FIG. 8B is a block diagram illustrating the fields of the specific vector friendly instruction format 800 that make up the full opcode field 774 according to one embodiment of the invention. Specifically, the full opcode field 774 includes the format field 740, the base operation field 742, and the data element width (W) field 764. The base operation field 742 includes the prefix encoding field 825, the opcode map field 815, and the real opcode field 830.

Register Index Field

FIG. 8C is a block diagram illustrating the fields of the specific vector friendly instruction format 800 that make up the register index field 744 according to one embodiment of the invention. Specifically, the register index field 744 includes the REX field 805, the REX' field 810, the MODR/M.reg field 844, the MODR/M.r/m field 846, the VVVV field 820, xxx field 854, and the bbb field 856.

Augmentation Operation Field

Figure 8D:
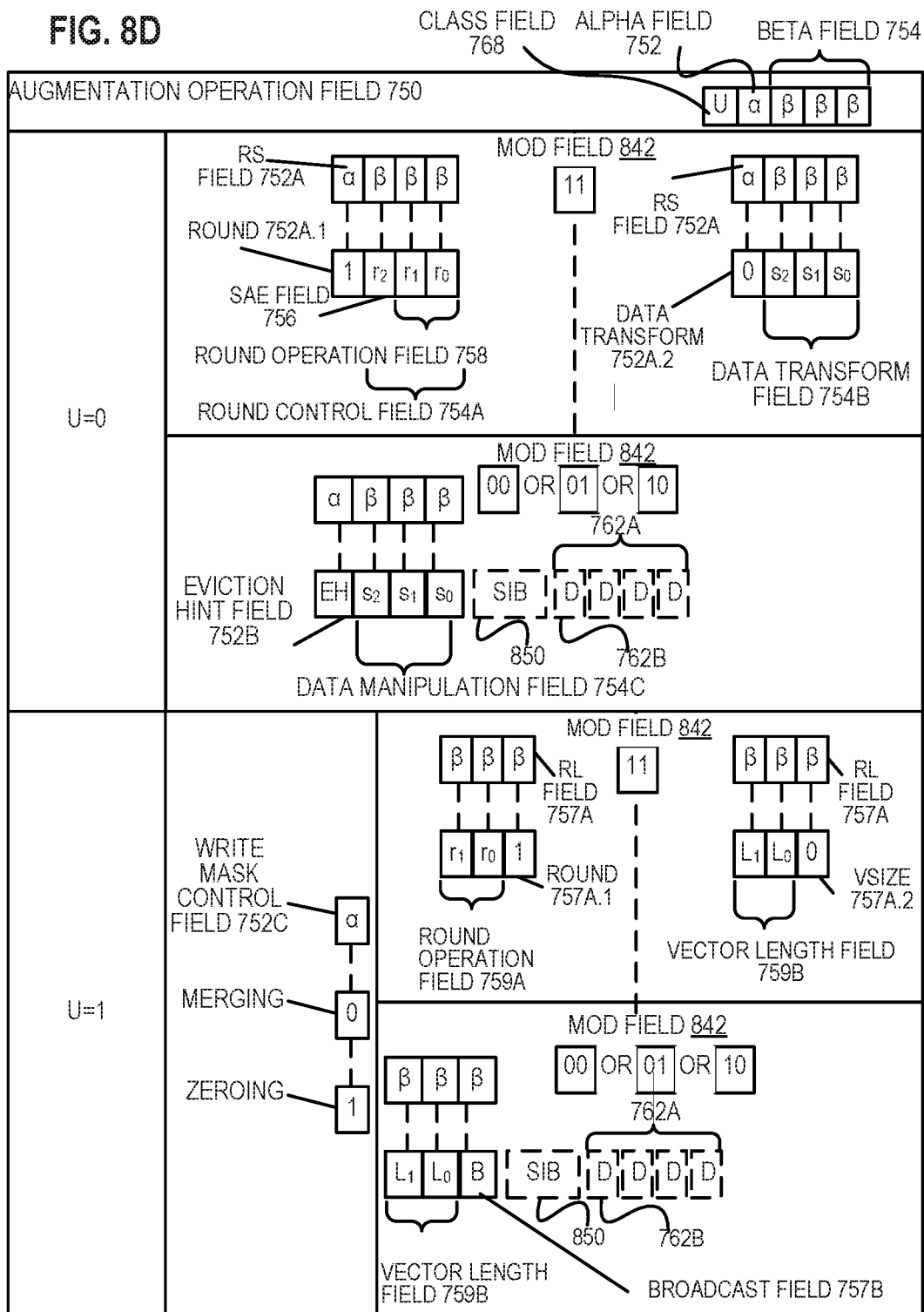
FIG. 8D is a block diagram illustrating the fields of the specific vector friendly instruction format that make up the augmentation operation field according to one embodiment of the invention.

FIG. 8D is a block diagram illustrating the fields of the specific vector friendly instruction format 800 that make up the augmentation operation field 750 according to one embodiment of the invention. When the class (U) field 768 contains 0, it signifies EVEX.U0 (class A 768A); when it contains 1, it signifies EVEX.U1 (class B 768B). When U=0 and the MOD field 842 contains 11 (signifying a no memory access operation), the alpha field 752 (EVEX byte 3, bit [7]—EH) is interpreted as the rs field 752A. When the rs field 752A contains a 1 (round 752A.1), the beta field 754 (EVEX byte 3, bits [6:4]—SSS) is interpreted as the round control field 754A. The round control field 754A includes a one bit SAE field 756 and a two bit round operation field 758. When the rs field 752A contains a 0 (data transform 752A.2), the beta field 754 (EVEX byte 3, bits [6:4]—SSS) is interpreted as a three bit data transform field 754B. When U=0 and the MOD field 842 contains 00, 01, or 10 (signifying a memory access operation), the alpha field 752 (EVEX byte 3, bit [7]—EH) is interpreted as the eviction hint (EH) field 752B and the beta field 754 (EVEX byte 3, bits [6:4]—SSS) is interpreted as a three bit data manipulation field 754C.

When U=1, the alpha field 752 (EVEX byte 3, bit [7]—EH) is interpreted as the write mask control (Z) field 752C. When U=1 and the MOD field 842 contains 11 (signifying a no memory access operation), part of the beta field 754 (EVEX byte 3, bit [4]—$S_0$) is interpreted as the RL field 757A; when it contains a 1 (round 757A.1) the rest of the beta field 754 (EVEX byte 3, bit [6-5]—$S_{2-1}$) is interpreted as the round operation field 759A, while when the RL field 757A contains a 0 (VSIZE 757.A2) the rest of the beta field 754 (EVEX byte 3, bit [6-5]—$S_{2-1}$) is interpreted as the vector length field 759B (EVEX byte 3, bit [6-5]—$L_{1-0}$). When U=1 and the MOD field 842 contains 00, 01, or 10 (signifying a memory access operation), the beta field 754 (EVEX byte 3, bits [6:4]—SSS) is interpreted as the vector length field 759B (EVEX byte 3, bit [6-5]—$L_{1-0}$) and the broadcast field 757B (EVEX byte 3, bit [4]—B).

Exemplary Register Architecture

FIG. 9 is a block diagram of a register architecture 900 according to one embodiment of the invention. In the embodiment illustrated, there are 32 vector registers 910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 800 operates on these overlaid register file as illustrated in the below tables.

| Adjustable Vector Length | Class | Operations | Registers |
|---|---|---|---|
| Instruction Templates that do not include the vector length field 759B | A (FIG. 7A; U = 0) | 710, 715, 725, 730 | zmm registers (the vector length is 64 byte) |
| | B (FIG. 7B; U = 1) | 712 | zmm registers (the vector length is 64 byte) |
| Instruction templates that do include the vector length field 759B | B (FIG. 7B; U = 1) | 717, 727 | zmm, ymm, or xmm registers (the vector length is 64 bytes, 32 bytes, or 16 byte) depending on the vector length field 759B |

In other words, the vector length field 759B selects between a maximum length and one or more other shorter lengths, where each such shorter length is half the length of the preceding length; and instructions templates without the vector length field 759B operate on the maximum vector length. Further, in one embodiment, the class B instruction templates of the specific vector friendly instruction format 800 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 915—in the embodiment illustrated, there are 8 write mask registers (k0 through k7), each 64 bits in size. In an alternate embodiment, the write mask registers 915 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 950—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 10A:
FIG. 10A is a block diagram illustrating both an exemplary in-order pipeline and an exemplary register renaming, out-of-order issue/execution pipeline according to embodiments of the invention.
Figure 10B:
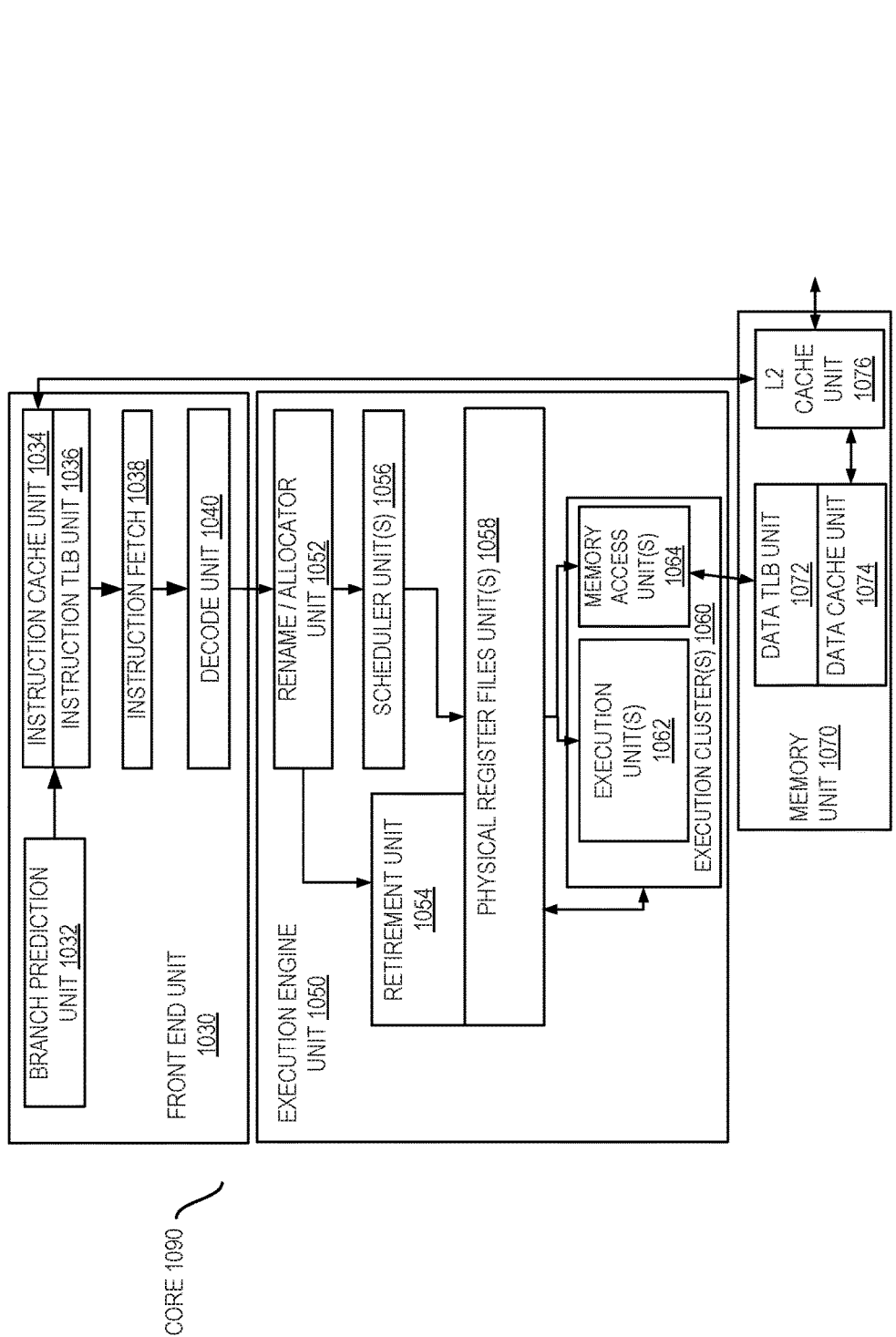
FIG. 10B is a block diagram illustrating both an exemplary embodiment of an in-order architecture core and an exemplary register renaming, out-of-order issue/execution architecture core to be included in a processor according to embodiments of the invention.

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length-decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register-renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1(L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 11B:
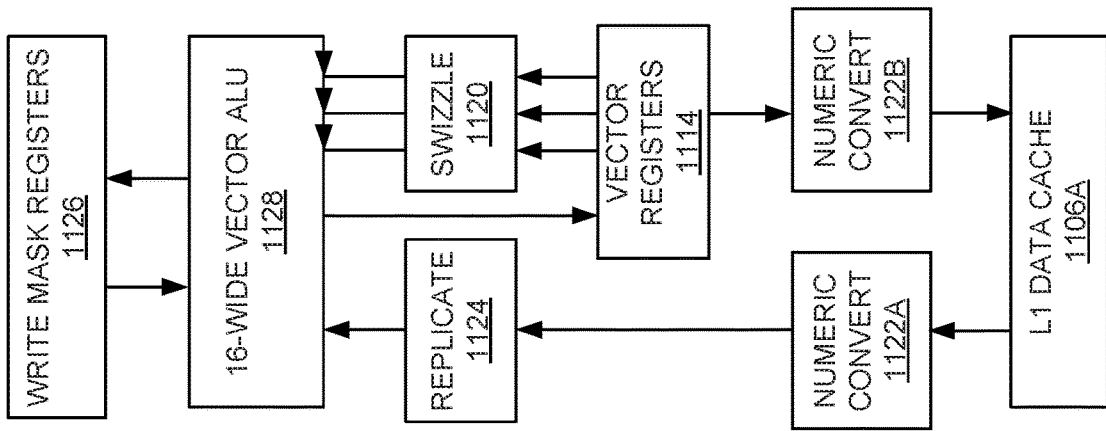
FIGS. 11A-B illustrate a block diagram of a more specific exemplary in-order core architecture, which core would be one of several logic blocks (including other cores of the same type and/or different types) in a chip.
Figure 11A:
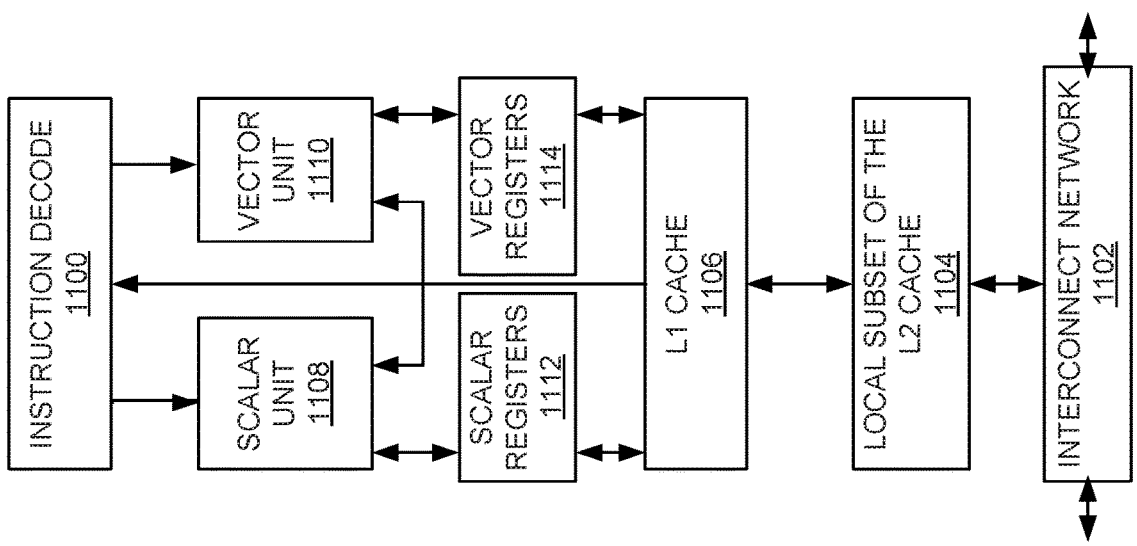

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1(L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
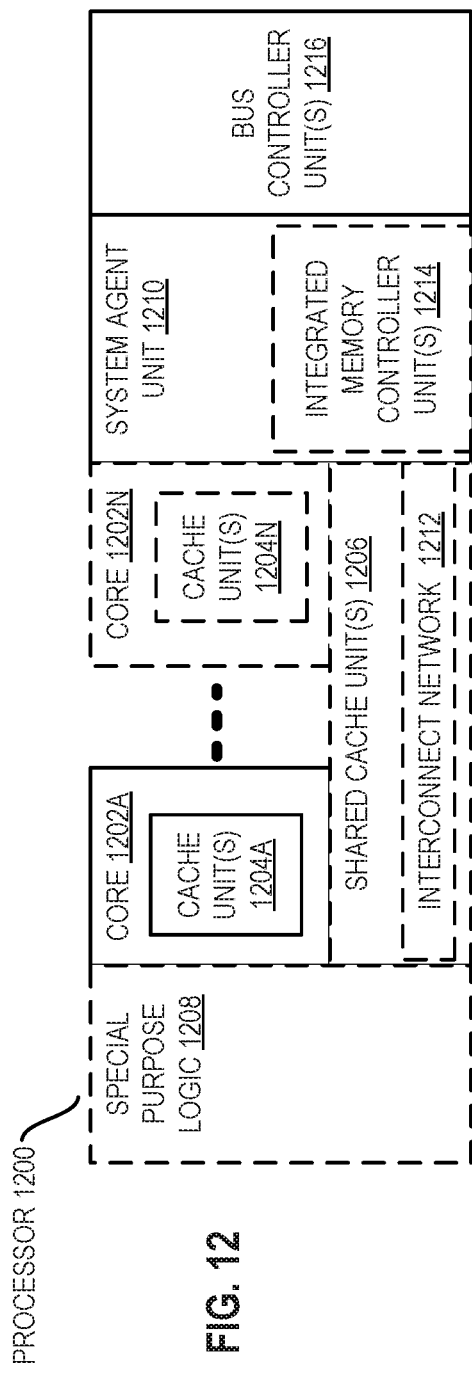
FIG. 12 is a block diagram of a processor that may have more than one core, may have an integrated memory controller, and may have integrated graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208 (integrated graphics logic 1208 is an example of and is also referred to herein as special purpose logic), the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multithreading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
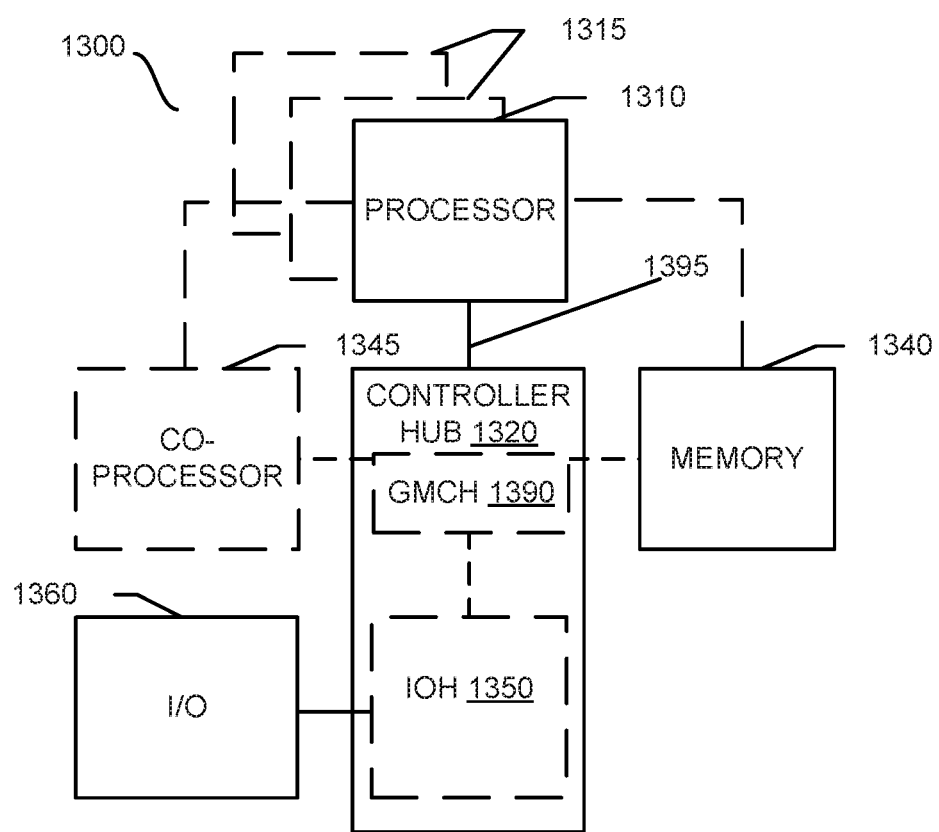
FIGS. 13-16 are block diagrams of exemplary computer architectures.

Referring now to FIG. 13, shown is a block diagram of a system 1300 in accordance with one embodiment of the present invention. The system 1300 may include one or more processors 1310, 1315, which are coupled to a controller hub 1320. In one embodiment, the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
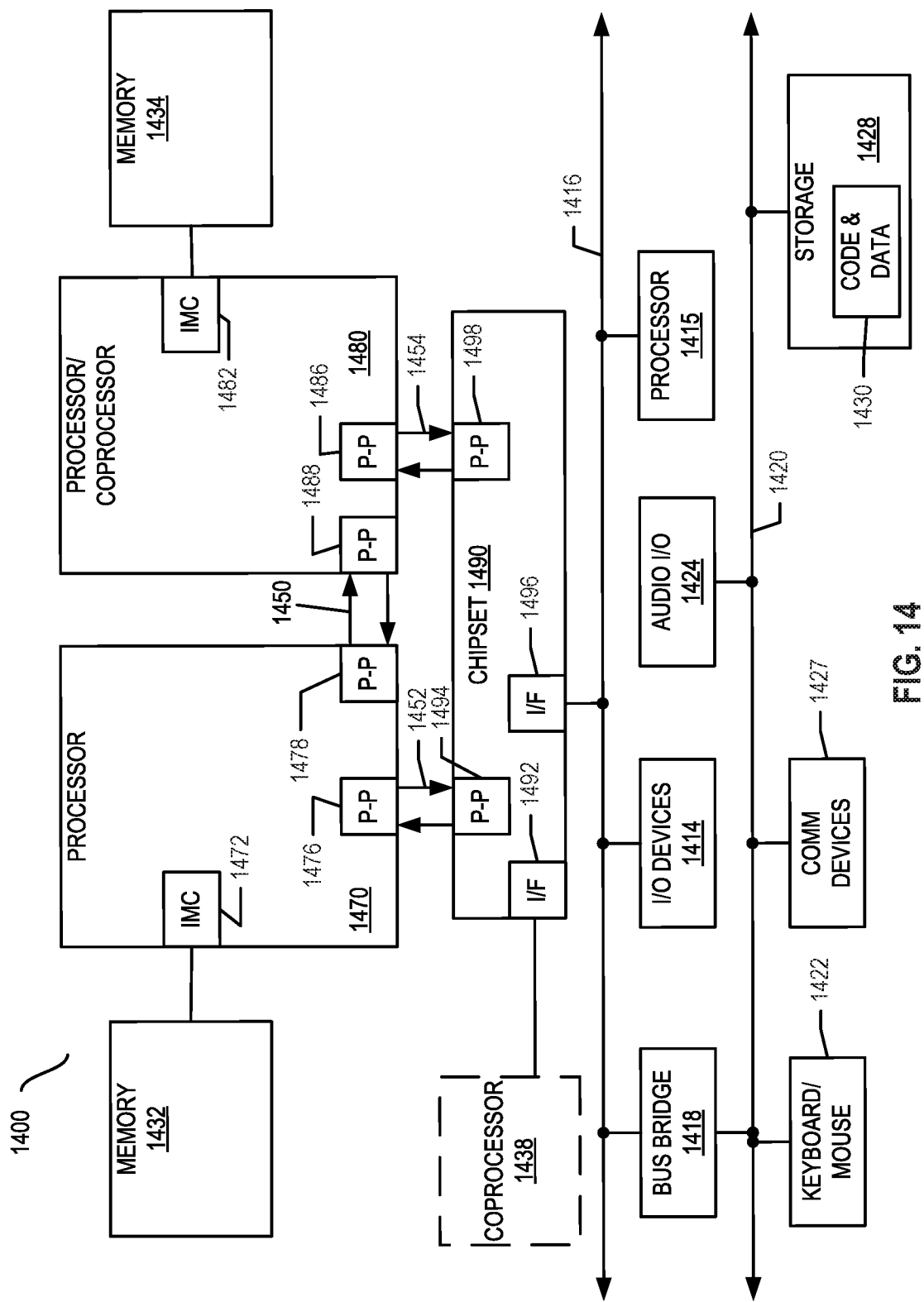

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1492. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
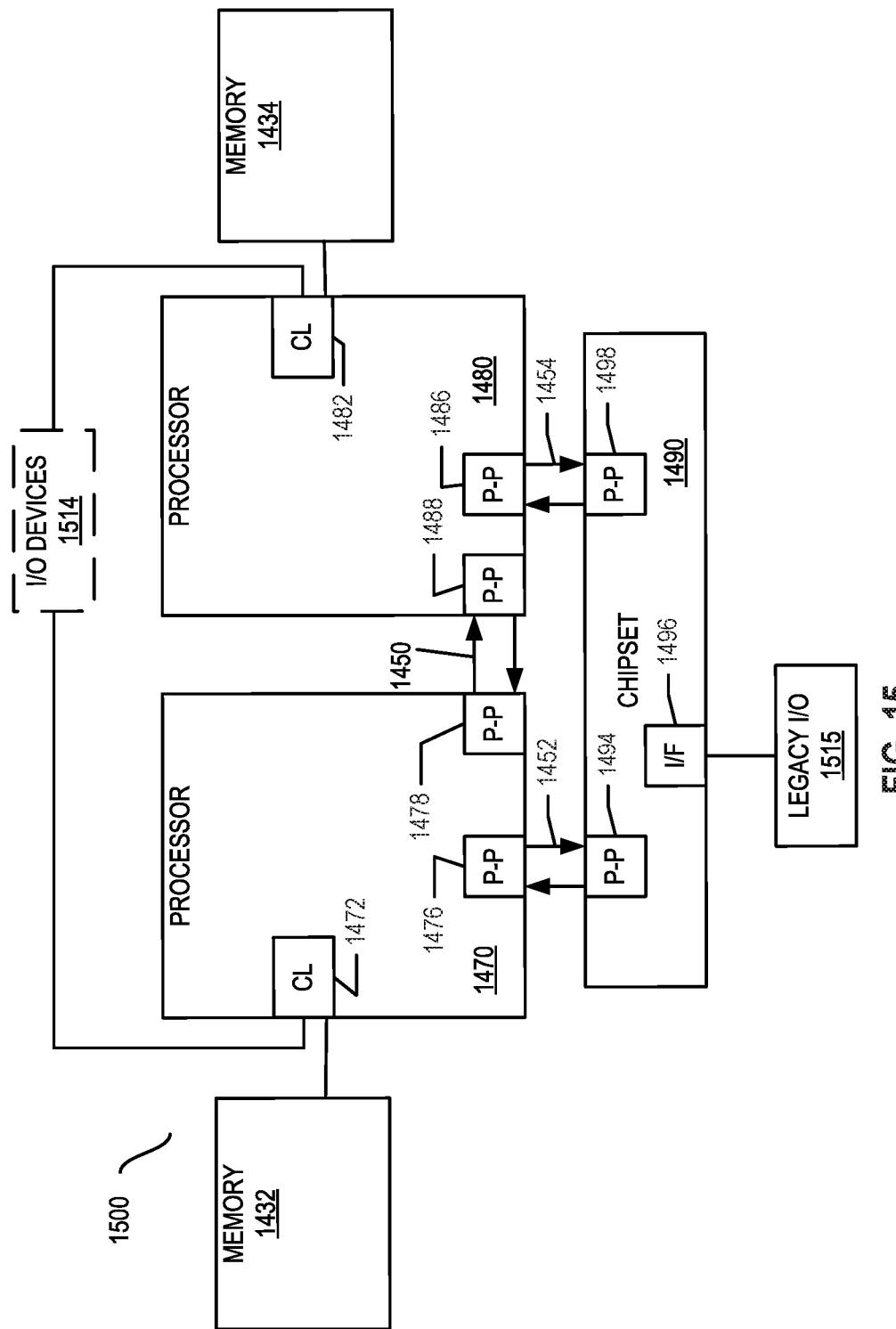

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
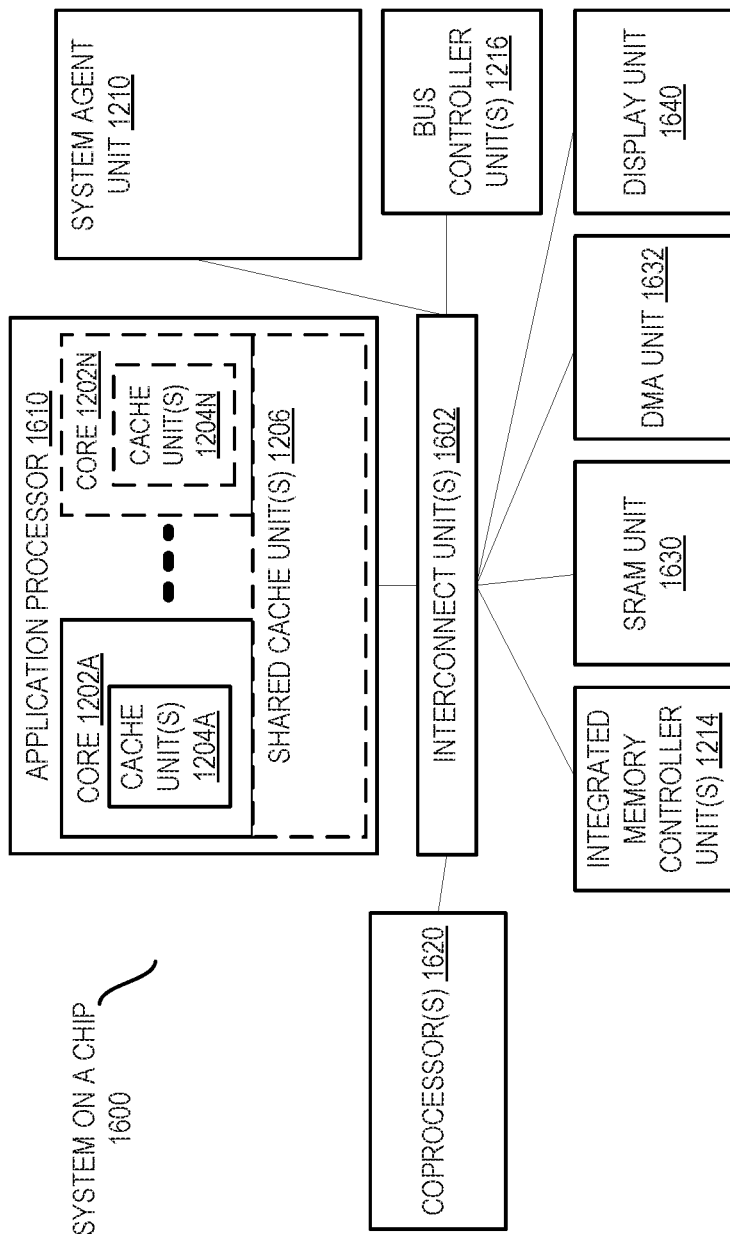

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 1202A-N, which include cache units 1204A-N, and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software or firmware in a processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

FURTHER EXAMPLES

Example 1 provides a system for executing remote atomic operation (RAO) instructions atomically with weak ordering, the system including: an RAO instruction queue stored in a memory and having entries grouped by destination cache line, each entry to enqueue one or more RAO instructions including an opcode, a destination identifier, and source data, optimization circuitry to receive an incoming RAO instruction, scan the RAO instruction queue to detect a matching enqueued RAO instruction identifying a same destination cache line as the incoming RAO instruction, the optimization circuitry further to: responsive to no matching enqueued RAO instruction being detected, enqueue the incoming RAO instruction in the RAO instruction queue; and responsive to a matching enqueued RAO instruction being detected, determine whether the incoming and matching RAO instructions have a same opcode to non-overlapping cache line elements, and, if so, spatially combine the incoming and matching RAO instructions by enqueuing both RAO instructions in a same group of destination cache line RAO instructions at different cache line offsets.

Example 2 includes the substance of the exemplary system of Example 1, wherein the optimization circuitry, responsive to determining that partial overlap exists because the incoming and matching RAO instructions have a same destination identifier and different but compatible opcodes, is further to conduct special processing by replacing the matching RAO instruction with a new instruction that, when executed, produces a same result as sequentially executing both instructions.

Example 3 includes the substance of the exemplary system of Example 1, wherein the optimization circuitry, responsive to determining that overlap does exist, is further to temporally combine the incoming and matching RAO instructions by replacing the matching RAO instruction with a new instruction that, when executed, produces a same result as sequentially executing both instructions.

Example 4 includes the substance of the exemplary system of Example 1, wherein the optimization circuitry, responsive to determining that partial overlap exists because the incoming and matching RAO instructions have a same destination identifier but different opcodes, is further to conduct special processing by delaying the incoming RAO instruction until the matching RAO instruction is complete and subsequently dispatching the incoming RAO instruction to be executed.

Example 5 includes the substance of the exemplary system of Example 1, wherein the incoming and enqueued RAO instructions each further include element size identifiers, wherein the optimization circuitry, responsive to determining that partial overlap exists because the incoming and matching RAO instructions have a same destination identifier and a same opcode but different identified element sizes, is further to conduct special processing by delaying the incoming RAO instruction until the matching RAO instruction is complete, and subsequently dispatching the incoming RAO instruction to be executed.

Example 6 includes the substance of the exemplary system of Example 1, wherein the optimization circuitry, responsive to determining that partial overlap exists because the incoming and matching RAO instructions have a same destination identifier but different opcodes, is further to conduct special processing by dispatching the matching RAO instruction to be executed with a to-be-continued signal set to TRUE, and subsequently dispatching the incoming RAO instruction to be executed.

Example 7 includes the substance of the exemplary system of any one of Examples 1-6, further including a regularly incrementing system counter, wherein each RAO instruction queue entry further includes an expiration timestamp, and wherein the optimization circuitry is further to, when enqueueing the incoming RAO instruction, initialize the expiration timestamp to a predetermined amount of time ahead of the system counter, the enqueued RAO instruction to be available to combine with other instructions as long as the expiration timestamp is ahead of the system counter.

Example 8 includes the substance of the exemplary system of Example 7, further including multiple cores, each incorporating an instance of the RAO instruction queue and an instance of the optimization circuitry, each core further including: fetch circuitry to fetch an RAO instruction from code storage, decode circuitry to decode and provide the fetched instruction to its instance of optimization circuitry; and scheduling circuitry to scan its instance of the RAO instruction queue, select an enqueued RAO instruction from among one or more enqueued RAO instructions whose expiration timestamps exceed the system counter, and dispatch the selected RAO instruction for execution by execution circuitry selected from among multiple execution circuits in the system, wherein the scheduling circuitry selects the RAO instruction out of order with respect to other enqueued RAO instructions, with an order selected to optimize at least one of latency, throughput, power, and performance.

Example 9 includes the substance of the exemplary system of any one of Examples 1-6, further including: a regularly incrementing system counter, wherein each RAO instruction queue entry further includes an expiration timestamp, and wherein the optimization circuitry is further to, when enqueueing the incoming RAO instruction, initialize the expiration timestamp to a predetermined amount of time ahead of the system counter, the enqueued RAO instruction to be available to combine with other instructions as long as the expiration timestamp is ahead of the system counter; and a cache control circuit incorporating instances of the RAO instruction queue and the optimization circuitry, the cache control circuit further including: interface circuitry to receive and provide RAO instructions to its instance of optimization circuitry, the optimization circuitry to combine the received RAO instruction with an RAO instruction enqueued in its RAO instruction queue if there is an opportunity to combine, and, if not, to enqueue the received RAO instruction in its RAO instruction queue, scheduling circuitry to scan its instance of the RAO instruction queue and select an RAO instruction among one or more enqueued RAO instructions whose expiration timestamps exceed the system counter, and to schedule the selected instruction to be executed, wherein the scheduling circuitry selects the RAO instruction out of order with respect to other enqueued RAO instructions, with an order selected to optimize at least one of latency, throughput, power, and performance; and execution circuitry to execute the selected RAO instruction by reading the entire cache line addressed by the destination identifier, performing the selected instruction on a cache line element addressed by the destination identifier, performing one or more additional enqueued RAO instructions whose identified destinations address the same cache line, writing the cache line back to the cache, and sending a confirmation to one or more requesting processing cores.

Example 10 includes the substance of the exemplary system of any one of Examples 1-6, further including: a regularly incrementing system counter, wherein each RAO instruction queue entry further includes an expiration timestamp, and wherein the optimization circuitry is further to, when enqueueing the incoming RAO instruction, initialize the expiration timestamp to a predetermined amount of time ahead of the system counter, the enqueued RAO instruction to be available to combine with other instructions as long as the expiration timestamp is ahead of the system counter; and a mid-level shared cache control circuit incorporating instances of the RAO instruction queue and the optimization circuitry, the mid-level shared cache control circuit further including: interface circuitry to receive and provide RAO instructions to its instance of optimization circuitry, the optimization circuitry to combine the received RAO instruction with an RAO instruction enqueued in its RAO instruction queue if there is an opportunity to combine, and, if not, to enqueue the received RAO instruction in its RAO instruction queue, scheduling circuitry to scan its instance of the RAO instruction queue and select an RAO instruction among one or more enqueued RAO instructions whose expiration timestamps exceed the current timestamp, and to schedule the selected instruction to be executed, wherein the scheduling circuitry selects the RAO instruction out of order with respect to other enqueued RAO instructions, with an order selected to optimize at least one of latency, throughput, power, and performance; and execution circuitry to execute the selected RAO instruction by reading the entire cache line addressed by the destination identifier, performing the selected RAO instruction on a cache line element addressed by the destination identifier, performing one or more additional enqueued RAO instructions whose identified destinations address the same cache line, writing the cache line back to the cache, and sending a confirmation to one or more requesting processing cores.

Example 11 provides a method of executing remote atomic operation (RAO) instructions atomically with weak ordering, the method including: receiving, by optimization circuitry, an incoming RAO instruction, scanning, by the optimization circuitry, an RAO instruction queue having entries grouped by destination cache line, each RAO instruction including an opcode, a destination identifier, and source data, and detecting a matching enqueued RAO instruction identifying a same destination cache line as the incoming RAO instruction, the optimization circuitry further to: responsive to no matching enqueued RAO instruction being detected, enqueue the incoming RAO instruction in the RAO instruction queue; and responsive to a matching enqueued RAO instruction being detected, determine whether the incoming and matching RAO instructions have a same opcode to non-overlapping cache line elements, and, if so, spatially combine the incoming and matching RAO instructions by enqueuing both RAO instructions in a same group of destination cache line RAO instructions at different cache line offsets.

Example 12 includes the substance of the exemplary method of Example 11, further including the optimization circuitry, responsive to determining that partial overlap exists because the incoming and matching RAO instructions have a same destination identifier and different but compatible opcodes, conducting special processing by replacing the matching RAO instruction with a new instruction that, when executed, produces a same result as sequentially executing both instructions.

Example 13 includes the substance of the exemplary method of Example 11, further including temporally combining, by the optimization circuitry, responsive to determining that overlap does exist, the incoming and matching RAO instructions by replacing the matching RAO instruction with a new instruction that, when executed, produces a same result as sequentially executing both instructions.

Example 14 includes the substance of the exemplary method of Example 11, further including conducting, by optimization circuitry, responsive to determining that partial overlap exists because the incoming and matching RAO instructions have a same destination identifier but different opcodes, special processing by delaying the incoming RAO instruction until the matching RAO instruction is complete and subsequently dispatching the incoming RAO instruction to be executed.

Example 15 includes the substance of the exemplary method of Example 11, wherein the incoming and enqueued RAO instructions each further include element size identifiers, and the optimization circuitry, responsive to determining that partial overlap exists because the incoming and matching RAO instructions have a same destination identifier and a same opcode but different identified element sizes, further conducts special processing by delaying the incoming RAO instruction until the matching RAO instruction is complete, and subsequently dispatching the incoming RAO instruction to be executed.

Example 16 includes the substance of the exemplary method of Example 11, further including conducting the optimization circuitry, responsive to determining that partial overlap exists because the incoming and matching RAO instructions have a same destination identifier but different opcodes, special processing by dispatching the matching RAO instruction to be executed with a to-be-continued signal set to TRUE, and subsequently dispatching the incoming RAO instruction to be executed.

Example 17 includes the substance of the exemplary method of any one of Examples 11-16, further including initializing, when enqueuing the incoming RAO instruction, an expiration timestamp to a predetermined amount of time ahead of a regularly incrementing system counter, wherein the expiration timestamp is maintained in the RAO instruction queue along with and enabling the incoming RAO instruction to combine with other incoming RAO instructions as long as the expiration timestamp is ahead of the system counter.

Example 18 includes the substance of the exemplary method of Example 17, further including: scanning, by scheduling circuitry, the RAO instruction queue to select an enqueued RAO instruction from among one or more enqueued RAO instructions whose expiration timestamps exceed the system counter; and dispatching, by the scheduling circuitry, the selected RAO instruction for execution by execution circuitry selected from among multiple execution circuits in the method, wherein the scheduling circuitry selects the RAO instruction out of order with respect to other enqueued RAO instructions, with an order selected to optimize at least one of latency, throughput, power, and performance.

Example 19 includes the substance of the exemplary method of Example 18, further including: receiving the dispatched RAO instruction by a cache control circuit, wherein the cache control circuit contains the selected execution circuitry and incorporates an instance of the optimization circuitry and an instance of the RAO instruction queue, providing, by the cache control circuit, the received RAO instruction to its instance of optimization circuitry, combining, by the instance of optimization circuitry, the received RAO instruction with an already-enqueued RAO instruction when there is an opportunity to spatially combine, and, if not, enqueuing the received RAO instruction in its RAO instruction queue, scanning, by cache control circuit scheduling circuitry, its instance of the RAO instruction queue to select an RAO instruction among one or more enqueued RAO instructions, whose expiration timestamps exceed the system counter; and executing the selected RAO instruction by reading the entire cache line addressed by the destination identifier from a cache, performing the selected RAO instruction on a cache line element addressed by the destination identifier, writing the cache line back to the cache, and sending a confirmation to one or more requesting processing cores.

Example 20 includes the substance of the exemplary method of any one of Examples 18, further including: receiving the dispatched RAO instruction by a mid-level cache control circuit, wherein the mid-level cache control circuit contains the selected execution circuitry and incorporates an instance of the optimization circuitry and an instance of the RAO instruction queue, combining, by the instance of optimization circuitry, the received RAO instruction with an already-enqueued RAO instruction when there is an opportunity to spatially combine the RAO instructions, and, if not, enqueuing the received RAO instruction in its RAO instruction queue, scanning, by scheduling circuitry of the mid-level cache control circuit, its instance of the RAO instruction queue to select an RAO instruction among one or more enqueued RAO instructions; and executing, by the mid-level cache-control circuit, the selected RAO instruction by reading the entire cache line addressed by the destination identifier from a mid-level cache, performing the selected RAO instruction on a cache line element addressed by the destination identifier, writing the cache line back to the mid-level cache, and sending a confirmation to one or more requesting processing cores.

Example 21 provides an apparatus for executing remote atomic operation (RAO) instructions atomically with weak ordering, the apparatus including: an RAO instruction queue having entries grouped by destination cache line, each entry to enqueue one or more RAO instructions including an opcode, a destination identifier, and source data, optimization means for receiving an incoming RAO instruction, scanning the RAO instruction queue to detect a matching enqueued RAO instruction identifying a same destination cache line as the incoming RAO instruction, the optimization means further to: responsive to no matching enqueued RAO instruction being detected, enqueue the incoming RAO instruction in the RAO instruction queue; and responsive to a matching enqueued RAO instruction being detected, determine whether the incoming and matching RAO instructions have a same opcode to non-overlapping cache line elements, and, if so, spatially combine the incoming and matching RAO instructions by enqueuing both RAO instructions in a same group of destination cache line RAO instructions, but at different cache line offsets.

Example 22 includes the substance of the exemplary apparatus of Example 21, wherein the optimization means, responsive to determining that partial overlap exists because the incoming and matching RAO instructions have a same destination identifier and different but compatible opcodes, is further to conduct special processing by replacing the matching RAO instruction with a new instruction that, when executed, produces a same result as sequentially executing both instructions.

Example 23 includes the substance of the exemplary apparatus of Example 21, wherein the optimization means, responsive to determining that overlap does exist, is further to temporally combine the incoming and matching RAO instructions by replacing the matching RAO instruction with a new instruction that, when executed, produces a same result as sequentially executing both instructions.

Example 24 includes the substance of the exemplary apparatus of Example 21, wherein the optimization means, responsive to determining that partial overlap exists because the incoming and matching RAO instructions have a same destination identifier but different opcodes, is further to conduct special processing by delaying the incoming RAO instruction until the matching RAO instruction is complete and subsequently dispatching the incoming RAO instruction to be executed.

Example 25 includes the substance of the exemplary apparatus of Example 21, wherein the incoming and enqueued RAO instructions each further include element size identifiers, wherein the optimization means, responsive to determining that partial overlap exists because the incoming and matching RAO instructions have a same destination identifier and a same opcode but different identified element sizes, is further to conduct special processing by delaying the incoming RAO instruction until the matching RAO instruction is complete, and subsequently dispatching the incoming RAO instruction to be executed.

Example 26 includes the substance of the exemplary apparatus of Example 21, wherein the optimization means, responsive to determining that partial overlap exists because the incoming and matching RAO instructions have a same destination identifier but different opcodes, is further to conduct special processing by dispatching the matching RAO instruction to be executed with a to-be-continued signal set to TRUE, and subsequently dispatching the incoming RAO instruction to be executed.

Example 27 includes the substance of the exemplary apparatus of any one of Examples 21-26, further including a regularly incrementing apparatus counter, wherein each RAO instruction queue entry further includes an expiration timestamp, and wherein the optimization means is further to, when enqueueing the incoming RAO instruction, initialize the expiration timestamp to a predetermined amount of time ahead of the apparatus counter, the enqueued RAO instruction to be available to combine with other instructions as long as the expiration timestamp is ahead of the apparatus counter.

Example 28 includes the substance of the exemplary apparatus of Example 27, further including multiple cores, each incorporating an instance of the RAO instruction queue and an instance of the optimization means, each core further including: fetch circuitry to fetch an RAO instruction from code storage, decode circuitry to decode and provide the fetched instruction to its instance of optimization means; and scheduling circuitry to scan its instance of the RAO instruction queue, select an RAO instruction from among one or more enqueued RAO instructions whose expiration timestamps exceed the apparatus counter, and to dispatch the selected RAO instruction for execution by execution circuitry selected from among multiple execution circuits in the apparatus, wherein the scheduling circuitry selects the RAO instruction out of order with respect to other enqueued RAO instructions, with an order selected to optimize at least one of latency, throughput, power, and performance.

Example 29 includes the substance of the exemplary apparatus of any one of Examples 21-26, further including: a regularly incrementing apparatus counter, wherein each RAO instruction queue entry further includes an expiration timestamp, and wherein the optimization means is further to, when enqueueing the incoming RAO instruction, initialize the expiration timestamp to a predetermined amount of time ahead of the apparatus counter, the enqueued RAO instruction to be available to combine with other instructions as long as the expiration timestamp is ahead of the apparatus counter; and a cache control circuit incorporating instances of the RAO instruction queue and the optimization means, the cache control circuit further including: interface circuitry to receive and provide RAO instructions to its instance of optimization means, the optimization means to combine the received RAO instruction with an RAO instruction enqueued in its RAO instruction queue if there is an opportunity to combine, and, if not, to enqueue the received RAO instruction in its RAO instruction queue, scheduling circuitry to scan its instance of the RAO instruction queue and select an RAO instruction among one or more enqueued RAO instructions whose expiration timestamps exceed the apparatus counter, and to schedule the selected instruction to be executed, wherein the scheduling circuitry selects the RAO instruction out of order with respect to other enqueued RAO instructions, with an order selected to optimize at least one of latency, throughput, power, and performance; and execution circuitry to execute the selected RAO instruction by reading the entire cache line addressed by the destination identifier, performing the selected instruction on a cache line element addressed by the destination identifier, performing one or more additional enqueued RAO instructions whose identified destinations address the same cache line, writing the cache line back to the cache, and sending a confirmation to one or more requesting processing cores.

Example 30 includes the substance of the exemplary apparatus of any one of Examples 21-26, further including: a regularly incrementing apparatus counter, wherein each RAO instruction queue entry further includes an expiration timestamp, and wherein the optimization means is further to, when enqueueing the incoming RAO instruction, initialize the expiration timestamp to a predetermined amount of time ahead of the apparatus counter, the enqueued RAO instruction to be available to combine with other instructions as long as the expiration timestamp is ahead of the apparatus counter; and a mid-level shared cache control circuit incorporating instances of the RAO instruction queue and the optimization means, the mid-level shared cache control circuit further including: interface circuitry to receive and provide RAO instructions to its instance of optimization means, the optimization means to combine the received RAO instruction with an RAO instruction enqueued in its RAO instruction queue if there is an opportunity to combine, and, if not, to enqueue the received RAO instruction in its RAO instruction queue, scheduling circuitry to scan its instance of the RAO instruction queue and select an RAO instruction among one or more enqueued RAO instructions whose expiration timestamps exceed the current timestamp, and to schedule the selected instruction to be executed, wherein the scheduling circuitry selects the RAO instruction out of order with respect to other enqueued RAO instructions, with an order selected to optimize at least one of latency, throughput, power, and performance; and execution circuitry to execute the selected RAO instruction by reading the entire cache line addressed by the destination identifier, performing the selected RAO instruction on a cache line element addressed by the destination identifier, performing one or more additional enqueued RAO instructions whose identified destinations address the same cache line, writing the cache line back to the cache, and sending a confirmation to one or more requesting processing cores.

Example 31 provides a non-transitory machine-readable medium having stored thereon instructions that, when executed by a processor, cause the processor to execute remote atomic operation (RAO) instructions atomically with weak ordering, by: receiving, by optimization circuitry, an incoming RAO instruction, scanning, by the optimization circuitry, an RAO instruction queue having entries grouped by destination cache line, each RAO instruction including an opcode, a destination identifier, and source data, and detecting a matching enqueued RAO instruction identifying a same destination cache line as the incoming RAO instruction, the optimization circuitry further to: responsive to no matching enqueued RAO instruction being detected, enqueue the incoming RAO instruction in the RAO instruction queue; and responsive to a matching enqueued RAO instruction being detected, determine whether the incoming and matching RAO instructions have a same opcode to non-overlapping cache line elements, and, if so, spatially combine the incoming and matching RAO instructions by enqueuing both RAO instructions in a same group of destination cache line RAO instructions, but at different cache line offsets.

Example 32 includes the substance of the exemplary non-transitory machine-readable medium of Example 31, wherein the stored instructions cause the processor to further execute the RAO instructions by the optimization circuitry, responsive to determining that partial overlap exists because the incoming and matching RAO instructions have a same destination identifier and different but compatible opcodes, conducting special processing by replacing the matching RAO instruction with a new instruction that, when executed, produces a same result as sequentially executing both instructions.

Example 33 includes the substance of the exemplary non-transitory machine-readable medium of Example 31, wherein the stored instructions further cause the processor to further execute the RAO instructions by: the optimization circuitry, responsive to determining that overlap does exist, temporally combining the incoming and matching RAO instructions by replacing the matching RAO instruction with a new instruction that, when executed, produces a same result as sequentially executing both instructions.

Example 34 includes the substance of the exemplary non-transitory machine-readable medium of Example 31, wherein the stored instructions further cause the processor to further execute the RAO instructions by the optimization circuitry, responsive to determining that partial overlap exists because the incoming and matching RAO instructions have a same destination identifier but different opcodes, conducting special processing by delaying the incoming RAO instruction until the matching RAO instruction is complete and subsequently dispatching the incoming RAO instruction to be executed.

Example 35 includes the substance of the exemplary non-transitory machine-readable medium of Example 31, wherein the incoming and enqueued RAO instructions each further include element size identifiers, and the optimization circuitry, responsive to determining that partial overlap exists because the incoming and matching RAO instructions have a same destination identifier and a same opcode but different identified element sizes, further conducts special processing by delaying the incoming RAO instruction until the matching RAO instruction is complete, and subsequently dispatching the incoming RAO instruction to be executed.

Example 36 includes the substance of the exemplary non-transitory machine-readable medium of Example 31, wherein the stored instructions further cause the processor to further execute the RAO instructions by: the optimization circuitry, responsive to determining that partial overlap exists because the incoming and matching RAO instructions have a same destination identifier but different opcodes, special processing by dispatching the matching RAO instruction to be executed with a to-be-continued signal set to TRUE, and subsequently dispatching the incoming RAO instruction to be executed.

Example 37 includes the substance of the exemplary non-transitory machine-readable medium of any one of Examples 31-36, wherein the stored instructions further cause the processor to further execute the RAO instructions by: initializing, when enqueuing the incoming RAO instruction, an expiration timestamp to a predetermined amount of time ahead of a regularly incrementing system counter, wherein the expiration timestamp is maintained in the RAO instruction queue along with and enabling the incoming RAO instruction to combine with other incoming RAO instructions as long as the expiration timestamp is ahead of the system counter.

Example 38 includes the substance of the exemplary non-transitory machine-readable medium of Example 37, wherein the stored instructions further cause the processor to further execute the RAO instructions by: scanning, by scheduling circuitry, the RAO instruction queue to select an enqueued RAO instruction from among one or more enqueued RAO instructions whose expiration timestamps exceed the system counter; and dispatching, by the scheduling circuitry, the selected RAO instruction for execution by execution circuitry selected from among multiple execution circuits in the method, wherein the scheduling circuitry selects the RAO instruction out of order with respect to other enqueued RAO instructions, with an order selected to optimize at least one of latency, throughput, power, and performance.

Example 39 includes the substance of the exemplary non-transitory machine-readable medium of Example 38, wherein the stored instructions further cause the processor to further execute the RAO instructions by: receiving the dispatched RAO instruction by a cache control circuit, wherein the cache control circuit contains the selected execution circuitry and incorporates an instance of the optimization circuitry and an instance of the RAO instruction queue, providing, by the cache control circuit, the received RAO instruction to its instance of optimization circuitry, combining, by the instance of optimization circuitry, the received RAO instruction with an already-enqueued RAO instruction when there is an opportunity to spatially combine, and, if not, enqueuing the received RAO instruction in its RAO instruction queue, scanning, by cache control circuit scheduling circuitry, its instance of the RAO instruction queue to select an RAO instruction among one or more enqueued RAO instructions, whose expiration timestamps exceed the system counter; and executing the selected RAO instruction by reading the entire cache line addressed by the destination identifier from a cache, performing the selected RAO instruction on a cache line element addressed by the destination identifier, writing the cache line back to the cache, and sending a confirmation to one or more requesting processing cores.

Example 40 includes the substance of the exemplary non-transitory machine-readable medium of Example 38, wherein the stored instructions further cause the processor to further execute the RAO instructions by: receiving the dispatched RAO instruction by a mid-level cache control circuit, wherein the mid-level cache control circuit contains the selected execution circuitry and incorporates an instance of the optimization circuitry and an instance of the RAO instruction queue, combining, by the instance of optimization circuitry, the received RAO instruction with an already-enqueued RAO instruction when there is an opportunity to spatially combine the RAO instructions, and, if not, enqueuing the received RAO instruction in its RAO instruction queue, scanning, by scheduling circuitry of the mid-level cache control circuit, its instance of the RAO instruction queue to select an RAO instruction among one or more enqueued RAO instructions; and executing, by the mid-level cache-control circuit, the selected RAO instruction by reading the entire cache line addressed by the destination identifier from a mid-level cache, performing the selected RAO instruction on a cache line element addressed by the destination identifier, writing the cache line back to the mid-level cache, and sending a confirmation to one or more requesting processing cores.

What is claimed is:

1. An apparatus comprising:
a decode circuit of a core to decode a first instruction into a decoded first instruction and a second instruction into a decoded second instruction;
an execution circuit of the core to execute the decoded first instruction to generate a first atomic read-modify-write operation for service in a memory outside of the core, and execute the decoded second instruction to generate a second atomic read-modify-write operation for service in the memory outside of the core; and
a circuit to combine the first atomic read-modify-write operation and the second atomic read-modify-write operation into a single atomic read-modify-write operation, and send the single atomic read-modify-write operation for service in the memory outside of the core,
wherein the circuit comprises a timeout counter for each atomic read-modify-write operation stored in a buffer that is set when a corresponding atomic read-modify-write operation is added to the buffer to allow time to identify an opportunity to combine the corresponding atomic read-modify-write operation with another atomic read-modify-write operation and, in response to the timeout counter expiring without a combination of the corresponding atomic read-modify-write operation with another atomic read-modify-write operation, the circuit is to cause the corresponding atomic read-modify-write operation to be serviced in the memory outside of the core.

2. The apparatus of claim 1, wherein:
the execution circuit is to cause the first atomic read-modify-write operation to be stored in the buffer; and
the circuit is to read a first one or more fields corresponding to the first atomic read-modify-write operation in the buffer and a second one or more fields corresponding to the second atomic read-modify-write operation to determine when to combine the first atomic read-modify-write operation and the second atomic read-modify-write operation into the single atomic read-modify-write operation.

3. The apparatus of claim 2, wherein the first one or more fields comprise a first valid mask to indicate which one or more cache line elements of a cache line are to be updated by the first atomic read-modify-write operation, and the second one or more fields comprise a second valid mask to indicate which one or more cache line elements of the cache line are to be updated by the second atomic read-modify-write operation.

4. The apparatus of claim 3, wherein the circuit is to combine the first atomic read-modify-write operation and the second atomic read-modify-write operation into the single atomic read-modify-write operation in response to no overlap between the one or more cache line elements of the cache line that are to be updated by the first atomic read-modify-write operation and the one or more cache line elements of the cache line that are to be updated by the second atomic read-modify-write operation.

5. The apparatus of claim 2, wherein the first one or more fields comprise a first opcode of the first instruction that specifies an operation of the first atomic read-modify-write operation, and the second one or more fields comprise a second opcode of the second instruction that specifies an operation of the second atomic read-modify-write operation.

6. The apparatus of claim 5, wherein the operations are integer additions.

7. The apparatus of claim 1, wherein the single atomic read-modify-write operation is to be serviced in the memory outside of the core by a caching and home agent.

8. A method comprising:
decoding, by a decode circuit of a core of a processor, a first instruction into a decoded first instruction and a second instruction into a decoded second instruction;
executing, by an execution circuit of the core, the decoded first instruction to generate a first atomic read-modify-write operation for servicing in a memory outside of the core, and the decoded second instruction to generate a second atomic read-modify-write operation for servicing in the memory outside of the core;
combining, by a circuit of the processor, the first atomic read-modify-write operation and the second atomic read-modify-write operation into a single atomic read-modify-write operation;
sending, by the circuit of the processor, the single atomic read-modify-write operation for servicing in the memory outside of the core; and
setting a timeout counter in the circuit when a corresponding atomic read-modify-write operation is added to a buffer to allow time to identify an opportunity to combine the corresponding atomic read-modify-write operation with another atomic read-modify-write operation and, in response to the timeout counter expiring without a combination of the corresponding atomic read-modify-write operation with another atomic read-modify-write operation, causing the corresponding atomic read-modify-write operation to be serviced in the memory outside of the core.

9. The method of claim 8, wherein the executing the decoded first instruction causes the first atomic read-modify-write operation to be stored in the buffer, and the method further comprises reading a first one or more fields corresponding to the first atomic read-modify-write operation in the buffer and a second one or more fields corresponding to the second atomic read-modify-write operation to determine when to combine the first atomic read-modify-write operation and the second atomic read-modify-write operation into the single atomic read-modify-write operation.

10. The method of claim 9, wherein the first one or more fields comprise a first valid mask indicating which one or more cache line elements of a cache line are to be updated by the first atomic read-modify-write operation, and the second one or more fields comprise a second valid mask indicating which one or more cache line elements of the cache line are to be updated by the second atomic read-modify-write operation.

11. The method of claim 10, wherein the combining the first atomic read-modify-write operation and the second atomic read-modify-write operation into the single atomic read-modify-write operation is in response to determining no overlap between the one or more cache line elements of the cache line that are to be updated by the first atomic read-modify-write operation and the one or more cache line elements of the cache line that are to be updated by the second atomic read-modify-write operation.

12. The method of claim 9, wherein the first one or more fields comprise a first opcode of the first instruction specifying an operation of the first atomic read-modify-write operation, and the second one or more fields comprise a second opcode of the second instruction specifying an operation of the second atomic read-modify-write operation.

13. The method of claim 12, wherein the operations are integer additions.

14. The method of claim 8, further comprising servicing the single atomic read-modify-write operation in the memory outside of the core by a caching and home agent.

15. A non-transitory machine readable medium that stores code that when executed by a machine causes the machine to perform a method comprising:
decoding, by a decode circuit of a core of a processor, a first instruction into a decoded first instruction and a second instruction into a decoded second instruction;
executing, by an execution circuit of the core, the decoded first instruction to generate a first atomic read-modify-write operation for servicing in a memory outside of the core, and the decoded second instruction to generate a second atomic read-modify-write operation for servicing in the memory outside of the core;
combining, by a circuit of the processor, the first atomic read-modify-write operation and the second atomic read-modify-write operation into a single atomic read-modify-write operation;
sending, by the circuit of the processor, the single atomic read-modify-write operation for servicing in the memory outside of the core; and
setting a timeout counter in the circuit when a corresponding atomic read-modify-write operation is added to a buffer to allow time to identify an opportunity to combine the corresponding atomic read-modify-write operation with another atomic read-modify-write operation and, in response to the timeout counter expiring without a combination of the corresponding atomic read-modify-write operation with another atomic read-modify-write operation, causing the corresponding atomic read-modify-write operation to be serviced in the memory outside of the core.

16. The non-transitory machine readable medium of claim 15, wherein the executing the decoded first instruction causes the first atomic read-modify-write operation to be stored in the buffer, and the method further comprises reading a first one or more fields corresponding to the first atomic read-modify-write operation in the buffer and a second one or more fields corresponding to the second atomic read-modify-write operation to determine when to combine the first atomic read-modify-write operation and the second atomic read-modify-write operation into the single atomic read-modify-write operation.

17. The non-transitory machine readable medium of claim 16, wherein the first one or more fields comprise a first valid mask indicating which one or more cache line elements of a cache line are to be updated by the first atomic read-modify-write operation, and the second one or more fields comprise a second valid mask indicating which one or more cache line elements of the cache line are to be updated by the second atomic read-modify-write operation.

18. The non-transitory machine readable medium of claim 17, wherein the combining the first atomic read-modify-write operation and the second atomic read-modify-write operation into the single atomic read-modify-write operation is in response to determining no overlap between the one or more cache line elements of the cache line that are to be updated by the first atomic read-modify-write operation and the one or more cache line elements of the cache line that are to be updated by the second atomic read-modify-write operation.

19. The non-transitory machine readable medium of claim 16, wherein the first one or more fields comprise a first opcode of the first instruction specifying an operation of the first atomic read-modify-write operation, and the second one or more fields comprise a second opcode of the second instruction specifying an operation of the second atomic read-modify-write operation.

20. The non-transitory machine readable medium of claim 19, wherein the operations are integer additions.

21. The non-transitory machine readable medium of claim 15, further comprising servicing the single atomic read-modify-write operation in the memory outside of the core by a caching and home agent.

* * * * *